United States Patent
Tanaka et al.

(10) Patent No.: US 10,298,459 B2
(45) Date of Patent: May 21, 2019

(54) METHOD, APPARATUS, AND STORAGE MEDIUM

(71) Applicant: FUJITSU LIMITED, Kawasaki-shi, Kanagawa (JP)

(72) Inventors: Jun Tanaka, Yokohama (JP); Toshio Sugimoto, Atsugi (JP); Masanori Kimura, Mishima (JP); Kei Ohishi, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 15/262,086

(22) Filed: Sep. 12, 2016

(65) Prior Publication Data

US 2017/0085496 A1    Mar. 23, 2017

(30) Foreign Application Priority Data

Sep. 18, 2015 (JP) .................................. 2015-185860

(51) Int. Cl.
*H04L 12/24* (2006.01)
*H04L 12/911* (2013.01)

(52) U.S. Cl.
CPC ........ *H04L 41/0896* (2013.01); *H04L 47/748* (2013.01)

(58) Field of Classification Search
CPC .. H04L 47/722; H04L 41/0896; H04L 47/748
USPC ........................................................ 370/232
See application file for complete search history.

(56) References Cited

U.S. PATENT DOCUMENTS

| | | | |
|---|---|---|---|
| 2001/0027484 A1 | 10/2001 | Nishi | |
| 2003/0016770 A1* | 1/2003 | Trans | H04B 1/00 375/346 |
| 2008/0040469 A1 | 2/2008 | Nishi | |
| 2011/0320620 A1* | 12/2011 | Cutler | H04L 63/102 709/229 |
| 2016/0154753 A1* | 6/2016 | Gittins | G06F 13/1663 710/117 |

FOREIGN PATENT DOCUMENTS

JP    2001-282760    10/2001

* cited by examiner

*Primary Examiner* — Jianye Wu
(74) *Attorney, Agent, or Firm* — Fujitsu Patent Center

(57) ABSTRACT

A method includes: receiving a reservation, made by a user from a user terminal, regarding a bandwidth of a line; first determining whether or not a total bandwidth of a bandwidth demanded by the reservation in a time slot related to the received reservation and a guaranteed bandwidth to one or more reserved users exceeds a permissible upper limit value of the line; when the total bandwidth exceeds the permissible upper limit value, calculating a reducible bandwidth based on a bandwidth shortage produced by subtracting the permissible upper limit value from the total bandwidth and statistical information of a use bandwidth consumed by the one or more reserved users; second determining a reduction bandwidth reduced from the guaranteed bandwidth based on the calculated reducible bandwidth; and assigning, by a processor, the determined reduction bandwidth to the bandwidth demanded by the reservation.

12 Claims, 19 Drawing Sheets

| CUSTOMER | | TIME SLOT | | | | | | | | | | | |
|---|---|---|---|---|---|---|---|---|---|---|---|---|---|
| | | 0 | 2 | 4 | 6 | 8 | 10 | 12 | 14 | 16 | 18 | 20 | 22 |
| A | Max [Mbps] | 200 | 200 | 200 | 200 | 200 | 200 | 200 | 200 | 200 | 200 | 200 | 200 |
| | Min [Mbps] | 100 | 100 | 100 | 100 | 100 | 100 | 100 | 100 | 100 | 100 | 100 | 100 |
| | stat [Mbps] | 10 | 10 | 10 | 70 | 180 | 100 | 200 | 100 | 110 | 90 | 70 | 50 |
| B | Max [Mbps] | 500 | 500 | 500 | 500 | 200 | 200 | 200 | 200 | 200 | 200 | 200 | 200 |
| | Min [Mbps] | 500 | 500 | 500 | 500 | 100 | 100 | 100 | 100 | 100 | 100 | 100 | 100 |
| | stat [Mbps] | 450 | 450 | 450 | 450 | 150 | 120 | 150 | 120 | 120 | 100 | 100 | 100 |
| C | Max [Mbps] | 300 | 300 | 300 | 300 | 300 | 300 | 300 | 300 | 300 | 300 | 300 | 300 |
| | Min [Mbps] | 100 | 100 | 100 | 100 | 100 | 100 | 100 | 100 | 100 | 100 | 100 | 100 |
| | stat [Mbps] | 200 | 200 | 200 | 200 | 200 | 150 | 200 | 150 | 150 | 100 | 100 | 100 |
| TOTAL | Max [Mbps] | 1000 | 1000 | 1000 | 1000 | 700 | 700 | 700 | 700 | 700 | 700 | 700 | 700 |

FIG. 4

| BANDWIDTH [Mbps] | 10 | 20 | 30 | 40 | 50 | 60 | ... | ... | ... | 970 | 980 | 990 | 1000 |
|---|---|---|---|---|---|---|---|---|---|---|---|---|---|
| CHARGE [THOUSAND YEN] | 100 | 150 | 190 | 235 | 260 | 290 | ... | ... | ... | 985 | 990 | 995 | 1000 |

| 20XX/XX/XX | | TIME SLOT | | | | | | | | | | | |
|---|---|---|---|---|---|---|---|---|---|---|---|---|---|
| CUSTOMER | | 0 | 2 | 4 | 6 | 8 | 10 | 12 | 14 | 16 | 18 | 20 | 22 |
| A | BANDWIDTH [Mbps] | 100 | 100 | 100 | 200 | 200 | 170 | 200 | 170 | 200 | 200 | 200 | 200 |
| | CHARGE [THOUSAND YEN] | 600 | 600 | 600 | 700 | 700 | 650 | 700 | 650 | 700 | 700 | 700 | 700 |
| B | BANDWIDTH [Mbps] | 500 | 500 | 500 | 500 | 200 | 200 | 200 | 200 | 200 | 200 | 200 | 200 |
| | CHARGE [THOUSAND YEN] | 900 | 900 | 900 | 900 | 700 | 700 | 700 | 700 | 700 | 700 | 700 | 700 |
| C | BANDWIDTH [Mbps] | 300 | 300 | 300 | 300 | 300 | 200 | 300 | 200 | 300 | 300 | 300 | 300 |
| | CHARGE [THOUSAND YEN] | 800 | 800 | 800 | 800 | 800 | 700 | 800 | 700 | 800 | 800 | 800 | 800 |
| ⋮ | ⋮ | ⋮ | ⋮ | ⋮ | ⋮ | ⋮ | ⋮ | ⋮ | ⋮ | ⋮ | ⋮ | ⋮ | ⋮ |

METHOD, APPARATUS, AND STORAGE MEDIUM

CROSS-REFERENCE TO RELATED APPLICATION

This application is based upon and claims the benefit of priority of the prior Japanese Patent Application No. 2015-185860, filed on Sep. 18, 2015, the entire contents of which are incorporated herein by reference.

FIELD

The embodiments discussed herein are related to a method, an apparatus, and a storage medium.

BACKGROUND

In a packet-based network line, heavy traffic is sometimes concentrated so that an increase occurs in packet discards and packet delays. The services that do not particularly take measures against packet discards and delays are called best-effort services. For example, the Internet is one of the examples of these services. On the other hand, bandwidth-guaranteed services that guarantees packet transfer up to a certain bandwidth are provided. In bandwidth-guaranteed services, the bandwidth contracted by a certain customer, who is a user, is a basically fixed bandwidth.

On the other hand, there is an idea of bandwidth on-demand services. In bandwidth on-demand services, a bandwidth is reserved and guaranteed for a certain period of time. For example, a bandwidth on-demand service is suitable for the case of using the bandwidth only for a few hours at night for taking a backup.

As an example of related art, Japanese Laid-open Patent Publication No. 2001-282760 is known.

SUMMARY

According to an aspect of the invention, a method includes: receiving a reservation, made by a user from a user terminal, regarding a bandwidth of a line; first determining whether or not a total bandwidth of a bandwidth demanded by the reservation in a time slot related to the received reservation and a guaranteed bandwidth to one or more reserved users exceeds a permissible upper limit value of the line; when the total bandwidth exceeds the permissible upper limit value, calculating a reducible bandwidth based on a bandwidth shortage produced by subtracting the permissible upper limit value from the total bandwidth and statistical information of a use bandwidth consumed by the one or more reserved users; second determining a reduction bandwidth reduced from the guaranteed bandwidth based on the calculated reducible bandwidth; and assigning, by a processor, the determined reduction bandwidth to the bandwidth demanded by the reservation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a bandwidth management table;

FIG. 4 illustrates an example of a charge management table;

FIG. 6 illustrates an example of an accounting table;

DESCRIPTION OF EMBODIMENTS

It is sometimes difficult for bandwidth on-demand services to be maintained as service businesses. For example, if a large number of users attempt to reserve scarce long-distance lines in the same time slot, it becomes difficult to accommodate all the users so that the services are deteriorated. Also, in a time slot having low demand, line reservations are sometimes not filled so that a business loss occurs for a business owner. Accordingly, a business risk becomes high for the business owner, and thus it becomes difficult to provide continuous services.

According to the present embodiment, it is desirable to make it possible to accept a new reservation even if a bandwidth is filled with reserved guaranteed bandwidths.

In the following, detailed descriptions will be given of embodiments of a bandwidth management device, a bandwidth management method, and a bandwidth management program according to the present disclosure with reference to the drawings. In this regard, the disclosed technique is not limited by the present embodiments. Also, the following embodiments may be suitably combined within a range in which they do not contradict.

First Embodiment

Figure 1:
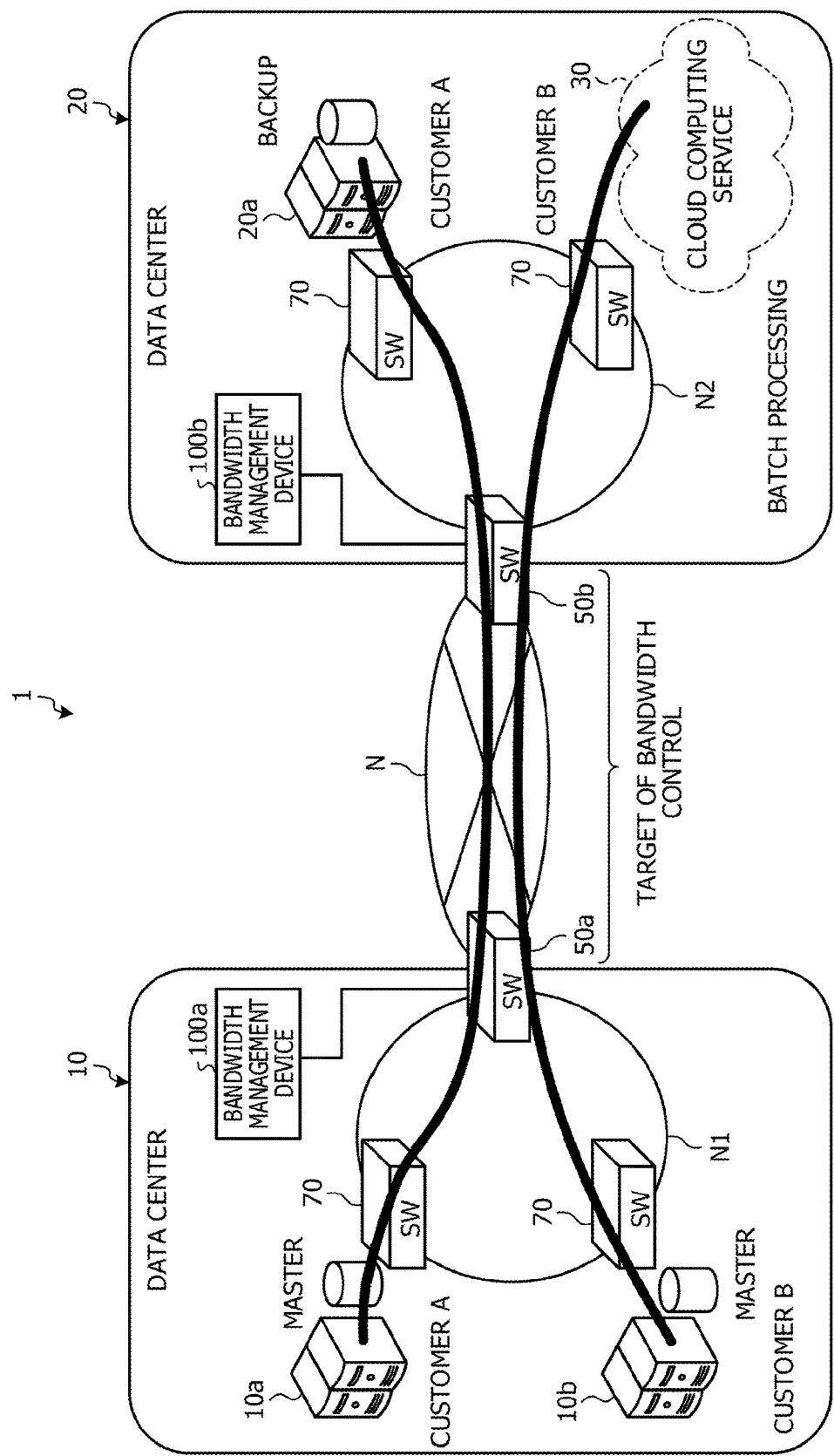
FIG. 1 is an explanatory diagram illustrating an example of a bandwidth management system according to a first embodiment.

FIG. 1 is an explanatory diagram illustrating an example of a bandwidth management system according to a first embodiment. A bandwidth management system 1 illustrated in FIG. 1 includes a data center 10 and a data center 20, and the data center 10 and the data center 20 are coupled by a network N. The bandwidth management system 1 guarantees bandwidth in accordance with the reservations of traffic of users at both ends of the network N that couples the data center 10 and the data center 20, for example. In this regard, in the following description, a description will be given using a customer of bandwidth on-demand services of the bandwidth management system 1 as an example.

The data center 10 includes, for example, respective switch devices 70 that couple an information processing unit 10a of a customer A and an information processing unit 10b of a customer B, and a switch device 50a that couples with the network N. The switch devices 70 and the switch device 50a are coupled by a network N1. A bandwidth management device 100a is coupled to the switch device 50a in order to perform bandwidth control of the network N.

In the same manner as the data center 10, the data center 20 includes, for example, respective switch devices 70 that couple an information processing unit 20a of the customer A and a cloud computing service 30 of the customer B, and a switch device 50b that couples with the network N. The switch devices 70 and the switch device 50b are coupled by a network N2. A bandwidth management device 100b is coupled to the switch device 50b in order to perform bandwidth control of the network N.

In the example in FIG. 1, the customer A, for example, transmits data of the information processing unit 10a in the data center 10 to the information processing unit 20a in the data center 20 at night to take a backup. Also, the customer B, for example, transmits sales data of the information processing unit 10b in the data center 10 to the cloud computing service 30 in the data center 20 at night to perform batch processing. That is to say, the customers, A and B, for example, want to use the bandwidth of the network N only at night and thus use the bandwidth on-demand services. In this case, in order to achieve the bandwidth on-demand services, bandwidth control is performed with respect to the switch devices 50a and 50b using the bandwidth management devices 100a and 100b. That is to say, the network N is the target of the bandwidth control. In this regard, in the following description, a description will be given using a bandwidth management device 100 and a switch device 50 without distinguishing the bandwidth management device 100a and the switch device 50a from the bandwidth management device 100b and the switch device 50b, respectively.

When the bandwidth management device 100 accepts a bandwidth reservation from a user, who is a customer, the bandwidth management device 100 determines whether or not the total bandwidth of the reservation bandwidth and the guaranteed bandwidth of the reserved users exceeds the permissible upper limit value of the line in a reservation time slot. If the total bandwidth exceeds the permissible upper limit value, the bandwidth management device 100 calculates a reducible bandwidth based on a bandwidth shortage produced by subtracting a permissible upper limit value from the total bandwidth, and the statistical information of the use bandwidth consumed by the reserved users. The bandwidth management device 100 determines a reduction bandwidth from the guaranteed bandwidth based on the calculated reducible bandwidth. The bandwidth management device 100 assigns the reservation bandwidth to a free bandwidth produced by reducing the determined reduction bandwidth from the guaranteed bandwidth. Thereby, it is possible for the bandwidth management device 100 to accept a new reservation even if the bandwidth is filled with the reserved guaranteed bandwidths.

Figure 2:
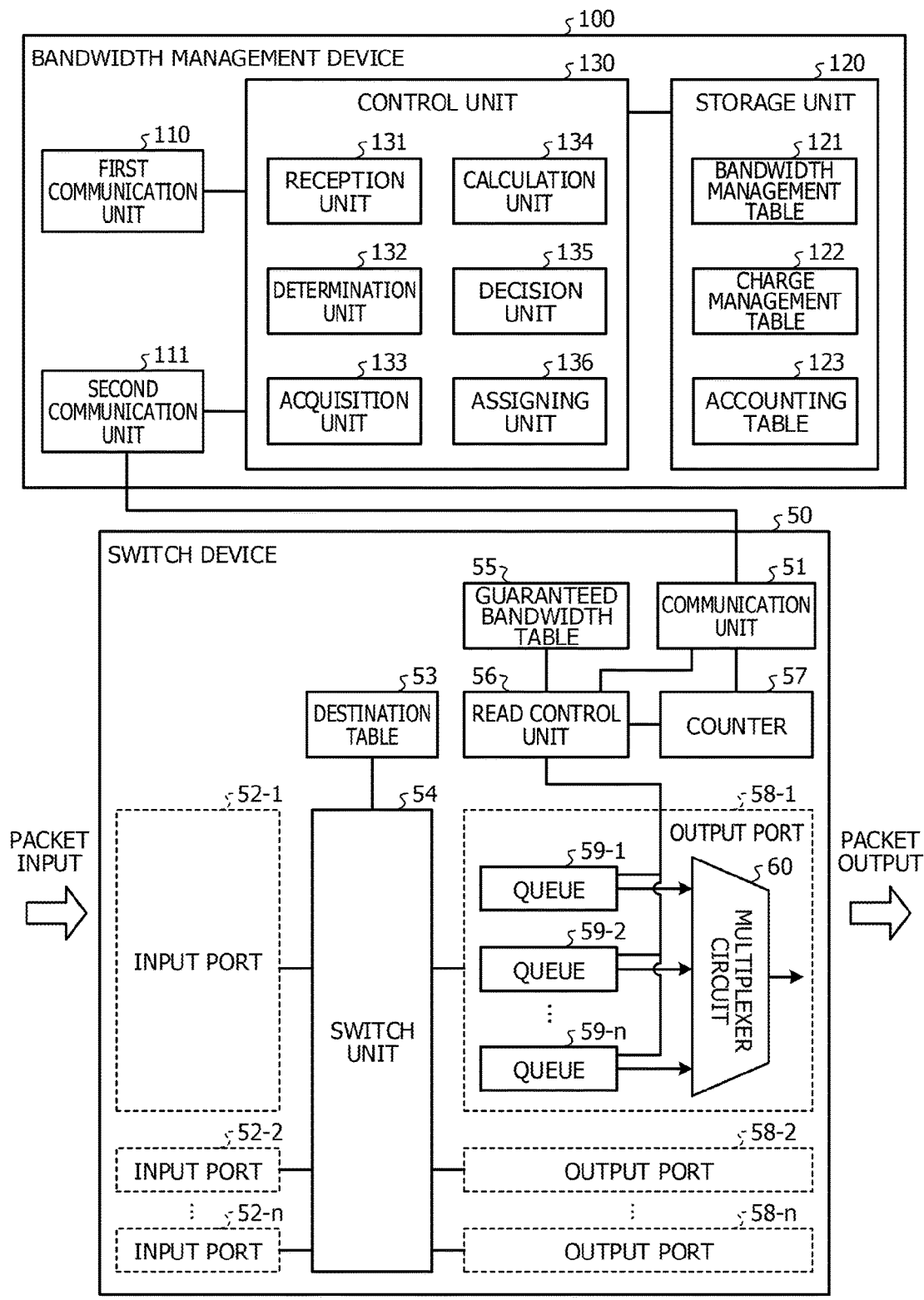
FIG. 2 illustrates an example of configurations of a bandwidth management device and a switch device according to the first embodiment.

FIG. 2 illustrates an example of configurations of a bandwidth management device and a switch device according to the first embodiment. First, a description will be given of the configuration of the switch device 50. As illustrated in FIG. 2, the switch device 50 includes a communication unit 51, input ports 52-1 to 52-n, a destination table 53, a switch unit 54, a guaranteed bandwidth table 55, a read control unit 56, a counter 57, and output ports 58-1 to 58-n. In this regard, the switch device 50 may include various kinds of functional units included in a known switch device other than the functional units illustrated in FIG. 2.

The communication unit 51 is actualized, for example, by a network interface card (NIC), or the like. The communication unit 51 is a communication interface that is wiredly or wirelessly coupled to the bandwidth management device 100, and controls communication of information with the bandwidth management device 100. The communication unit 51 receives, for example, guaranteed bandwidth information corresponding to each customer from the bandwidth management device 100. The communication unit 51 outputs the received guaranteed bandwidth information to the read control unit 56. Also, when statistical information is input from the counter 57 to the communication unit 51, the communication unit 51 transmits the input statistical information to the bandwidth management device 100.

The input ports 52-1 to 52-n are coupled to, for example, the internal network N1 or N2 in the data center 10 or 20, respectively, and packets are input from the network N1 or N2. The input ports 52-1 to 52-n output the input packets to the switch unit 54. In this regard, if the input ports 52-1 to 52-n are not distinguished, they are collectively expressed as an input port 52.

The destination table 53 holds a destination of a packet input to the input port 52. The destination table 53 holds, for example, an Internet Protocol (IP) address of the destination, a mask, an IP address of the next node, a media access control (MAC) address, a port number, and the like.

The switch unit 54 outputs a packet input from the input port 52 to an output port corresponding to the IP address of the destination with reference to the destination table 53.

The guaranteed bandwidth table 55 stores guaranteed bandwidth information corresponding to each customer, which has been received from the bandwidth management device 100. The guaranteed bandwidth table 55 stores the maximum guaranteed bandwidth, the minimum guaranteed bandwidth, and the like for each customer and for each time slot, for example.

When guaranteed bandwidth information is input from the communication unit 51 to the read control unit 56, the read control unit 56 stores the input guaranteed bandwidth information in the guaranteed bandwidth table 55. Also, the read control unit 56 refers to the guaranteed bandwidth table 55, and sets a bandwidth for the output queue held for each customer with respect to the output ports 58-1 to 58-n. Further, the read control unit 56 obtains packets output from each output queue of the output ports 58-1 to 58-n, and outputs the packets to the counter 57.

When packets are input from the read control unit 56 to the counter 57, the counter 57 calculates statistics of the use bandwidth for each customer corresponding to each output queue, and generates statistical information. The counter 57 transmits the generated statistical information to the bandwidth management device 100 via the communication unit 51.

The output ports 58-1 to 58-n individually includes queues 59-1 to 59-n, which are individual output queues, and a multiplexer circuit 60. The output ports 58-1 to 58-n are, for example, coupled to the network N, which is the target of bandwidth control, and output packets to the network N. In this regard, if the output ports 58-1 to 58-n are not distinguished, they are collectively expressed as an output port 58. The queues 59-1 to 59-n are set for each customer. For the queues 59-1 to 59-n, the read control unit 56 sets a read bandwidth for each customer. In this regard, if the queues 59-1 to 59-n are not distinguished, they are collectively expressed as a queue 59. The multiplexer circuit 60 multiplexes the output packet of the queues 59-1 to 59-n, and outputs the packets to the network N. When a packet is input from the switch unit 54 to the output port 58, the output port 58 stores the packet into the corresponding queue 59, and outputs the packet to the network N in the bandwidth in accordance with the read bandwidth set for each queue 59 via the multiplexer circuit 60.

Next, a description will be given of the configuration of the bandwidth management device 100. As illustrated in FIG. 2, the bandwidth management device 100 includes a first communication unit 110, a second communication unit 111, a storage unit 120, and a control unit 130. In this regard, the bandwidth management device 100 may include various functional units possessed by a well-known computer, which are other than the functional units illustrated in FIG. 2. For example, the bandwidth management device 100 may include functional units, such as various input devices, an audio output device, or the like.

The first communication unit 110 is actualized by an NIC, or the like, for example. The first communication unit 110 is wiredly or wirelessly coupled to the information processing units 10a and 10b, and an information processing unit of the customers who make reservations, not illustrated in FIG. 2, via the network N1, for example. The first communication unit 110 is a communication interface that controls communication of information between the information processing units 10a and 10b and the information processing units of the customers who make reservations. The first communication unit 110 receives a reservation of bandwidth from the information processing units 10a and 10b, and the information processing units of the customers who make reservations, for example. The first communication unit 110 outputs the reservations of the received bandwidth to the control unit 130. Also, when a reservation result, accounting information, and the like are input from the control unit 130 to the first communication unit 110, the first communication unit 110 transmits the input reservation result, the accounting information, and the like to the information processing units 10a and 10b, and the information processing units of the customers who make reservations via the network N1, for example.

The second communication unit 111 is actualized by an NIC, or the like, for example. The second communication unit 111 is a communication interface that is coupled to the switch device 50 and controls communication of information with the switch device 50. When the second communication unit 111 receives statistical information from the switch device 50, the second communication unit 111 outputs the received statistical information to the control unit 130. Also, when guaranteed bandwidth information is input from the control unit 130 to the second communication unit 111, the second communication unit 111 transmits the input guaranteed bandwidth information to the switch device 50.

In this regard, the first communication unit 110 and the second communication unit 111 may be integrated into one communication unit.

The storage unit 120 is achieved by a semiconductor memory element, such as a random access memory (RAM), a flash memory, or the like, or a storage device, such as a hard disk, an optical disc, or the like, for example. The storage unit 120 includes a storage area that stores information, such as a bandwidth management table 121, a charge management table 122, an accounting table 123, or the like. Also, the storage unit 120 stores information used for the processing by the control unit 130.

The bandwidth management table 121 stores the maximum guaranteed bandwidth, the minimum guaranteed bandwidth and statistical information for each customer and for each time slot in association with one another. FIG. 3 illustrates an example of the bandwidth management table. As illustrated in FIG. 3, the bandwidth management table 121 has items, such as "customer" and "time slot". One table in the bandwidth management table 121 indicates information for one day, and there are tables for one week in the bandwidth management table 121, for example. That is to say, the bandwidth management table 121 supports day variation and weekly variation of bandwidth.

The "customer" is an identifier that identifies a customer who uses the network N which is the target of bandwidth control. The "customer" includes items, such as "Max", which indicates the maximum guaranteed bandwidth, "Min", which indicates the minimum guaranteed bandwidth, and "stat", which indicates statistical information of the use bandwidth of the same time slot in the past for each customer. In this regard, the unit of each item is Mbps, for example. The "time slot" is information indicating a time unit for managing a bandwidth. For example, one day is divided into time slots for individual two hours. In the example in FIG. 3, in a time slot of "0 o'clock to 2 o'clock" of the customer "A", the maximum guaranteed bandwidth is "200" Mbps, the minimum guaranteed bandwidth is "100" Mbps, and the statistical information is "10" Mbps. Also, the item "Total" is information indicating the reserved bandwidth of the total lines of the network N, that is to say, information indicating the total bandwidth of "Max" of each customer.

Referring back to FIG. 2, the charge management table 122 stores a bandwidth and a charge in association with each other. FIG. 4 illustrates an example of the charge management table. As illustrated in FIG. 4, the charge management table 122 includes items, such as "bandwidth" and "charge".

A "bandwidth" is a piece of information indicating a guaranteed bandwidth, and its unit is Mbps. For example, if the permissible upper limit value of a line is 1000 Mbps, the "bandwidth" is set to a range of 10 Mbps to 1000 Mbps at 10 Mbps intervals. A "charge" is a piece of information indicating a charge in accordance with a guaranteed bandwidth, and its unit is thousand yen. In the example in FIG. 4, if the bandwidth is "10" Mbps, the charge is set to "100" thousand yen, that is to say, one hundred thousand yen, and if the bandwidth is "20" Mbps, the charge is set to the bandwidth is "150" thousand yen, and so on up to the bandwidth of 1000 Mbps.

Figure 5:
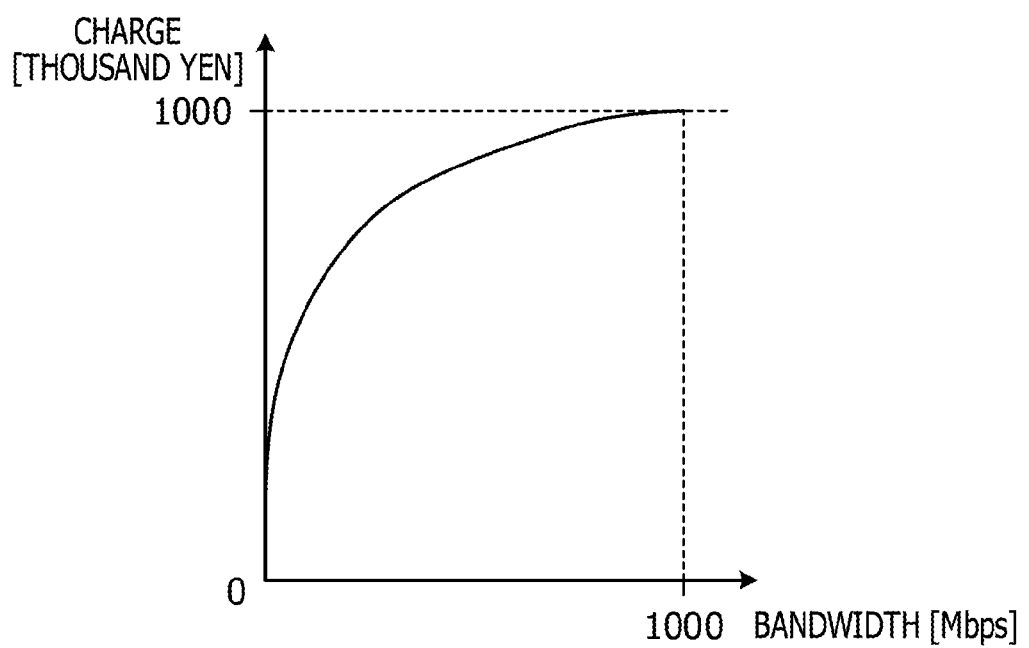
FIG. 5 illustrates an example of a charge graph.

Also, the charge management table 122 is not limited to the table illustrated in FIG. 4, and may be replaced by a function that expresses a relationship between bandwidth and charge. Thereby, a charge corresponding to a bandwidth may be calculated using the function. FIG. 5 illustrates an example of a charge graph. The charge graph illustrated in FIG. 5 is an example of a function that expresses the relationship between bandwidth and charge.

Referring back to FIG. 2, the accounting table 123 stores reserved bandwidth and charge in association with each other. FIG. 6 illustrates an example of the accounting table. As illustrated in FIG. 6, the accounting table 123 has items, such as "customer" and "time slot". In the accounting table 123, one table indicates the data for one day, and, for example, the tables up to the closing date of charge for each month are included. That is to say, the accounting table 123 also stores the bandwidth and the charge of the past date and time.

A "customer" is an identifier for identifying a customer who uses the network N, which is the target of bandwidth control. The "customer" includes items, such as "bandwidth" indicating the reserved bandwidth for each customer, and "charge" indicating the charge in accordance with the reserved bandwidth. The "bandwidth" is the information indicating the reserved bandwidth, and its unit is Mbps. The "charge" is the information indicating the charge in accordance with the reserved bandwidth, and its unit is thousand yen. The "time slot" is the information indicating the time unit by which bandwidth is managed. For example, one day is divided into time slots of every two hours. In the example in FIG. 6, the time slot of "0 o'clock to 2 o'clock" of the customer "A" indicates that the reserved bandwidth is "100" Mbps, and the charge is "600" thousand yen.

Referring back to FIG. 2, the control unit 130 is actualized by, for example, a central processing unit (CPU), a micro processing unit (MPU), or the like that executes the programs stored in the internal storage device using the RAM as a working area. Also, the control unit 130 may be actualized by an integrated circuit, for example, an application specific integrated circuit (ASIC), a field programmable gate array (FPGA), or the like. The control unit 130 includes a reception unit 131, a determination unit 132, an acquisition unit 133, a calculation unit 134, a decision unit 135, and an assigning unit 136. The control unit 130 actualizes or executes the functions and the operation of the information processing described below. In this regard, the internal configuration of the control unit 130 is not limited to the configuration illustrated in FIG. 2, and may be another configuration as long as the information processing described below is performed.

The reception unit 131 accepts bandwidth reservations, for example, from the information processing units 10a and 10b, and the information processing unit of the customer who makes a reservation via the first communication unit 110. In this regard, in the following description, a description will be given on the assumption that reservations have been already accepted from the information processing units 10a and 10b corresponding to the customers A and B, respectively, and a bandwidth reservation is accepted from the information processing unit of a new customer who makes a reservation. That is to say, the customers A and B are reserved customers. When the reception unit 131 accepts a bandwidth reservation, the reception unit 131 outputs a determination instruction to the determination unit 132. In this regard, if the accepted bandwidth reservation includes a repetition, such as every week or every month, the reception unit 131 may automatically make a reservation at the time of starting the reservation acceptance period.

When a determination instruction is input from the reception unit 131 or the decision unit 135 to the determination unit 132, the determination unit 132 determines whether or not the bandwidths of all the reservation time slots have been checked. If the bandwidths of all the reservation time slots have been checked, the determination unit 132 outputs an assigning instruction to the assigning unit 136. If the bandwidths of all the reservation time slots have not been checked, the determination unit 132 calculates the total bandwidth of a reservation bandwidth and the guaranteed bandwidths of the reserved customers, and a bandwidth shortage. Here, the bandwidth shortage is obtained, for example, as follows. The bandwidth shortage=((the guaranteed bandwidth of the reserved customers+the reservation bandwidth)−the permissible upper limit value of the line). For example, if the guaranteed bandwidth of the reserved customers is 800 Mbps, the reservation bandwidth is 300 Mbps, and the permissible upper limit value of the line is 1000 Mbps, the bandwidth shortage becomes (800+300)−1000=100 Mbps.

When the determination unit 132 calculates the bandwidth shortage, the determination unit 132 determines whether or not there is a bandwidth shortage, that is to say, whether or not the total bandwidth of the reservation bandwidth and the guaranteed bandwidth of the reserved customer exceeds the permissible upper limit value. If the total bandwidth does not exceed the permissible upper limit value, it is possible to directly set the reservation of the customer who makes a reservation, and thus the determination unit 132 sets the reservation in the bandwidth management table 121, and terminates the processing. If the total bandwidth exceeds the permissible upper limit value, the determination unit 132 outputs the bandwidth shortage and a calculation instruction to the calculation unit 134 in order to calculate a reducible bandwidth of the guaranteed bandwidth of the reserved customer. In other words, when the determination unit 132 accepts a bandwidth reservation from a customer who makes a reservation, the determination unit 132 determines whether or not the total bandwidth of the reservation bandwidth and the guaranteed bandwidth of the reserved customer exceeds the permissible upper limit value of the line in the reservation time slot.

The acquisition unit 133 receives and obtains statistical information from the switch device 50 via the second communication unit 111. The acquisition unit 133 obtains statistical information, for example, at five-minute intervals, and calculates the average value or the maximum value for each time slot of the bandwidth management table 121. The acquisition unit 133 stores the calculated average value or maximum value in the bandwidth management table 121 as statistical information of the corresponding time slot.

When the bandwidth shortage and the calculation instruction are input from the determination unit 132 to the calculation unit 134, the calculation unit 134 determines whether or not individual reducible bandwidths for all the reserved customers have been calculated. If the individual reducible bandwidths for not all the reserved customers have been calculated, the calculation unit 134 calculates an individual reducible bandwidth of an uncalculated reserved customer. The calculation unit 134 refers to the bandwidth management table 121, the calculation unit 134 obtains the maximum guaranteed bandwidth and the statistical information of the reserved customer corresponding to the accepted reservation time slot. The calculation unit 134 calculates the individual reducible bandwidth of a reserved customer whose individual reducible bandwidth has not been calculated as follows. The individual reducible bandwidth=(the maximum guaranteed bandwidth−(the higher value out of the minimum guaranteed bandwidth and the statistical information)).

If the calculation unit 134 has calculated the individual reducible bandwidths for all the reserved customers, the calculation unit 134 calculates the total of the individual reducible bandwidths as a reducible bandwidth. In this regard, if the number of the reserved customers whose individual reducible bandwidths have been calculated is one, the individual reducible bandwidth=the reducible bandwidth. In other words, if the total bandwidth exceeds the permissible upper limit value, the calculation unit 134 calculates a reducible bandwidth based on the bandwidth shortage produced by subtracting the permissible upper limit value from the total bandwidth and the statistical information of the use bandwidth consumed by the reserved customer.

Also, the calculation unit 134 determines whether or not the reducible bandwidth exceeds the bandwidth shortage. If the reducible bandwidth is less than or equal to the bandwidth shortage, the calculation unit 134 notifies the information processing unit of the customer who makes a reservation of a rejection of the reservation via the first communication unit 110, and terminates the processing. If the reducible bandwidth exceeds the bandwidth shortage, the calculation unit 134 outputs a decision instruction to the decision unit 135.

Figure 7:
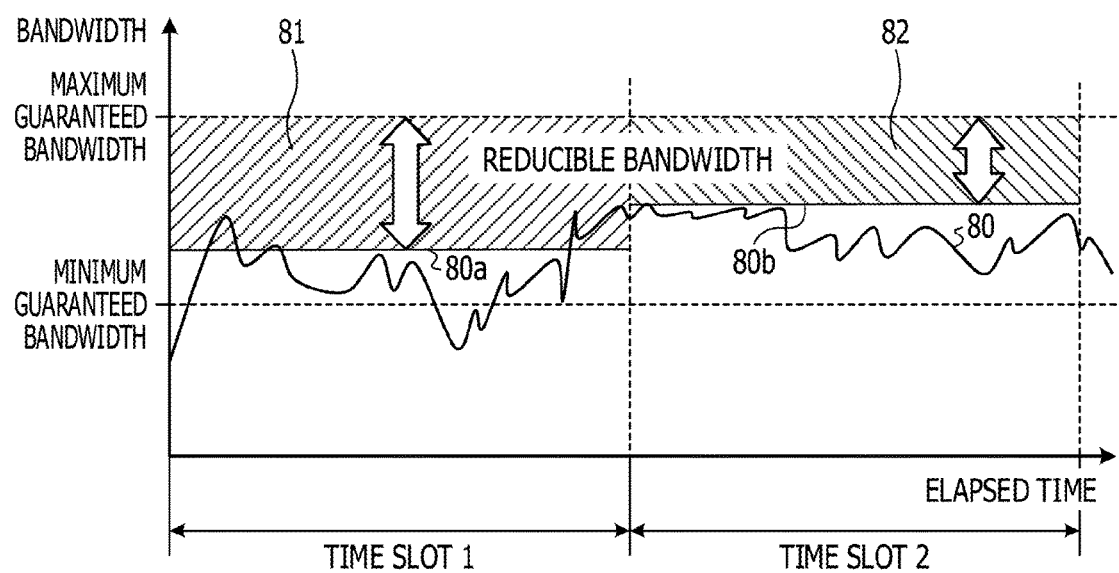
FIG. 7 illustrates an example of calculation of a reducible bandwidth using statistical information.

Here, a description will be given of calculation of an individual reducible bandwidth with reference to FIG. 7. FIG. 7 illustrates an example of calculation of a reducible bandwidth using statistical information. FIG. 7 illustrates a statistical information graph 80 of the reserved customer, which is obtained in a "time slot 1" and a "time slot 2", and the maximum guaranteed bandwidth and the minimum guaranteed bandwidth of the customer. In FIG. 7, for example, a bandwidth 81, which is the difference between the average value 80*a* of the statistical information and the maximum guaranteed bandwidth in the "time slot 1", becomes a reducible bandwidth. Also, in FIG. 7, for example, a bandwidth 82, which is the difference between the maximum value 80*b* of the statistical information and the maximum guaranteed bandwidth in the "time slot 2", becomes a reducible bandwidth. In this regard, the graph 80 is a graph of the raw data of statistical information in order to describe the average value and the maximum value of the statistical information.

Referring back to FIG. 2, when the decision instruction is input from the calculation unit 134 to the decision unit 135, the decision unit 135 executes decision processing for deciding a reduction bandwidth that is to be reduced from the guaranteed bandwidth of the reserved customer, that is to say, the individual reduction bandwidth from the guaranteed bandwidth of the reserved customer. When the decision instruction is input from the calculation unit 134 to the decision unit 135, the decision unit 135 extracts a customer having the individual reducible bandwidth equal to or higher than a predetermined value out of the reserved customers. Here, the predetermined value is 5 Mbps, for example.

The decision unit 135 sorts the extracted customers in ascending order of the individual reducible bandwidth. The decision unit 135 calculates an evenly divided bandwidth based on the bandwidth shortage and the number of extracted customers. The evenly divided bandwidth is obtained as follows, for example. The evenly divided bandwidth=(the bandwidth shortage/the number of extracted customers). The decision unit 135 selects a customer in ascending order of the individual reducible bandwidth. The decision unit 135 determines whether or not the individual reducible bandwidth of the selected customer is equal to or higher than the evenly divided bandwidth.

If the individual reducible bandwidth of the selected customer is not equal to or higher than the evenly divided bandwidth, the decision unit 135 decides the individual reducible bandwidth of the selected customer as the individual reduction bandwidth of the customer. Also, the decision unit 135 subtracts the individual reduction bandwidth of the customer from the bandwidth shortage. Further, the decision unit 135 subtracts 1 from the number of customers, and recalculates and updates the evenly divided bandwidth. The decision unit 135 repeats the processing for deciding the individual reduction bandwidth for the next customer.

If the individual reducible bandwidth of the selected customer is equal to or higher than the evenly divided bandwidth, the decision unit 135 decides the evenly divided bandwidth as the individual reduction bandwidth for the selected customer and thereafter, outputs the individual reduction bandwidth of each of the decided customers to the assigning unit 136, and terminates the decision processing. That is to say, the decision unit 135 decides a reduction bandwidth, which is the amount to be reduced from the guaranteed bandwidth, based on the calculated reducible bandwidth. In other words, the decision unit 135 decides the individual reduction bandwidth produced by evenly dividing the reduction bandwidth for the guaranteed bandwidth of the reserved customers having the individual reducible bandwidth equal to higher than a predetermined value out of a plurality of reserved customers. Also, when the decision unit 135 terminates the decision processing, the decision unit 135 outputs a determination instruction to the determination unit 132. In this regard, if it is not possible to allocate all the evenly divided bandwidths of the reduction bandwidth to the extracted customers in the decision processing, the decision unit 135 decreases a predetermined value of the individual reducible bandwidth for each customer and performs the decision processing again so as to assign the individual reduction bandwidth to a customer having less individual reducible bandwidth. Thereby, the decision unit 135 avoids a phenomenon in which assigning the bandwidth is not possible even if the reducible bandwidth exceeds the bandwidth shortage.

When the individual reduction bandwidth of each customer is input from the decision unit 135 into the assigning unit 136, and an assigning instruction is input from the determination unit 132 into the assigning unit 136, the assigning unit 136 determines whether or not the updates of all the time slots has been completed. If the updates of all the time slots has not been completed, the assigning unit 136 updates the bandwidth management table 121 by a new maximum guaranteed bandwidth produced by subtracting the individual reduction bandwidth for each reserved customer determined for each time slot from the individual maximum guaranteed bandwidth. That is to say, the assigning unit 136 reduces the determined reduction bandwidth from the guaranteed bandwidth of the reserved customer to generate a free bandwidth. Also, the assigning unit 136 assigns the reservation bandwidth to the generated free bandwidth, and stores the assignment result to the bandwidth management table 121. In other words, the assigning unit 136 assigns the reservation bandwidth to the free bandwidth produced by reducing the individual reduction bandwidth determined individually from the guaranteed bandwidth of the reserved customer having the individual reducible bandwidth higher than a predetermined value.

The assigning unit 136 refers to the updated bandwidth management table 121, and generates guaranteed bandwidth information corresponding to each customer. The assigning unit 136 transmits the generated guaranteed bandwidth information to the switch device 50 via the second communication unit 111. Also, the assigning unit 136 calculates a charge based on a new maximum guaranteed bandwidth and the reservation bandwidth that are stored in the updated bandwidth management table 121, and updates the accounting table 123. The assigning unit 136 repeats the processing concerning assigning until the update of all the time slots has been completed. When the update of all the time slots has been completed, the bandwidth management processing is terminated. Also, the assigning unit 136, for example, refers to the accounting table 123 once a month, generates the accounting information of each customer, and transmits the generated accounting information to the information processing unit of each customer via the first communication unit 110.

Figure 8:
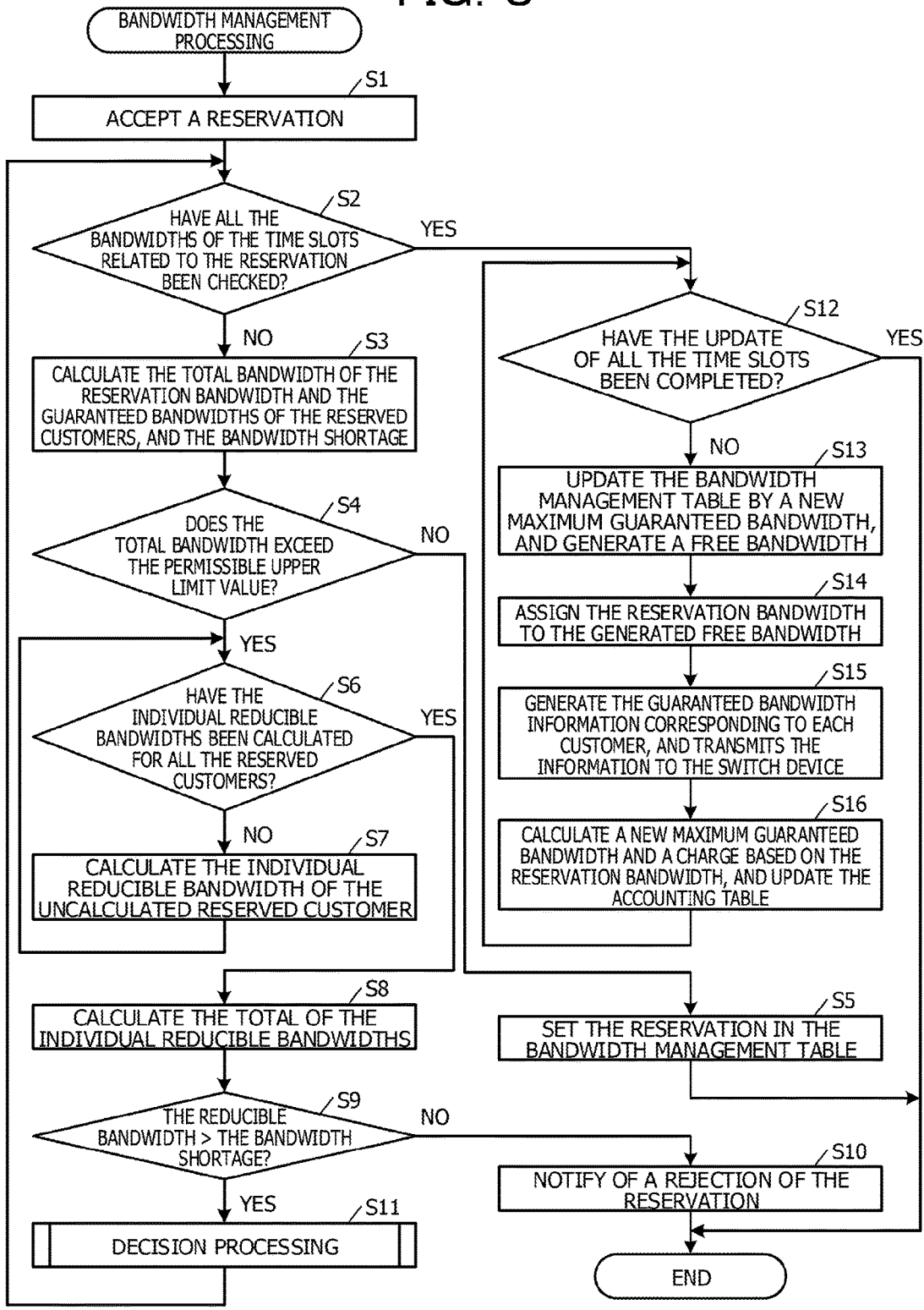
FIG. 8 is a flowchart illustrating an example of bandwidth management processing according to the first embodiment.

Next, a description will be given of operation of the bandwidth management device 100 according to the first embodiment. FIG. 8 is a flowchart illustrating an example of bandwidth management processing according to the first embodiment.

The reception unit 131 of the bandwidth management device 100, for example, accepts a bandwidth reservation from the information processing unit of a customer via the first communication unit 110 (step S1). When the reception unit 131 accepts the reservation, the reception unit 131 outputs a determination instruction to the determination unit 132.

When the determination instruction is input from the reception unit 131 to the determination unit 132, the determination unit 132 determines whether or not all the bandwidths of the time slots related to the reservation have been checked (step S2). If all the bandwidths of the time slots related to the reservations have not been checked (step S2: negation), the determination unit 132 calculates the total bandwidth of the reservation bandwidth and the guaranteed bandwidths of the reserved customers, and the bandwidth shortage (step S3). After the determination unit 132 calculates the bandwidth shortage, the determination unit 132 determines whether or not the total bandwidth exceeds the permissible upper limit value (step S4). If the total bandwidth does not exceed the permissible upper limit value (step S4: negation), the determination unit 132 sets the reservation of the customer who makes the reservation in the bandwidth management table 121 (step S5), and terminates the bandwidth management processing. If the total bandwidth exceeds the permissible upper limit value (step S4: affirmation), the determination unit 132 outputs the bandwidth shortage and the calculation instruction to the calculation unit 134.

When the bandwidth shortage and the calculation instruction are input from the determination unit 132 to the calculation unit 134, the calculation unit 134 determines whether or not the individual reducible bandwidths have been calculated for all the reserved customers (step S6). If the individual reducible bandwidths of not all of the reserved customers have been calculated (step S6: negation), the calculation unit 134 calculates the individual reducible bandwidth of the uncalculated reserved customer (step S7), and the processing returns to step S6. If the calculation unit 134 has calculated the individual reducible bandwidths for all the reserved customers (step S6: affirmation), the calculation unit 134 calculates the total of the individual reducible bandwidths as a reducible bandwidth (step S8).

The calculation unit 134 determines whether or not the reducible bandwidth exceeds the bandwidth shortage (step S9). If the reducible bandwidth is less than or equal to the bandwidth shortage (step S9: negation), the calculation unit 134 notifies the information processing unit of the customer who makes a reservation of a rejection of the reservation (step S10), and terminates the bandwidth management processing. If the reducible bandwidth exceeds the bandwidth shortage (step S9: affirmation), the calculation unit 134 outputs the decision instruction to the decision unit 135.

Figure 9:
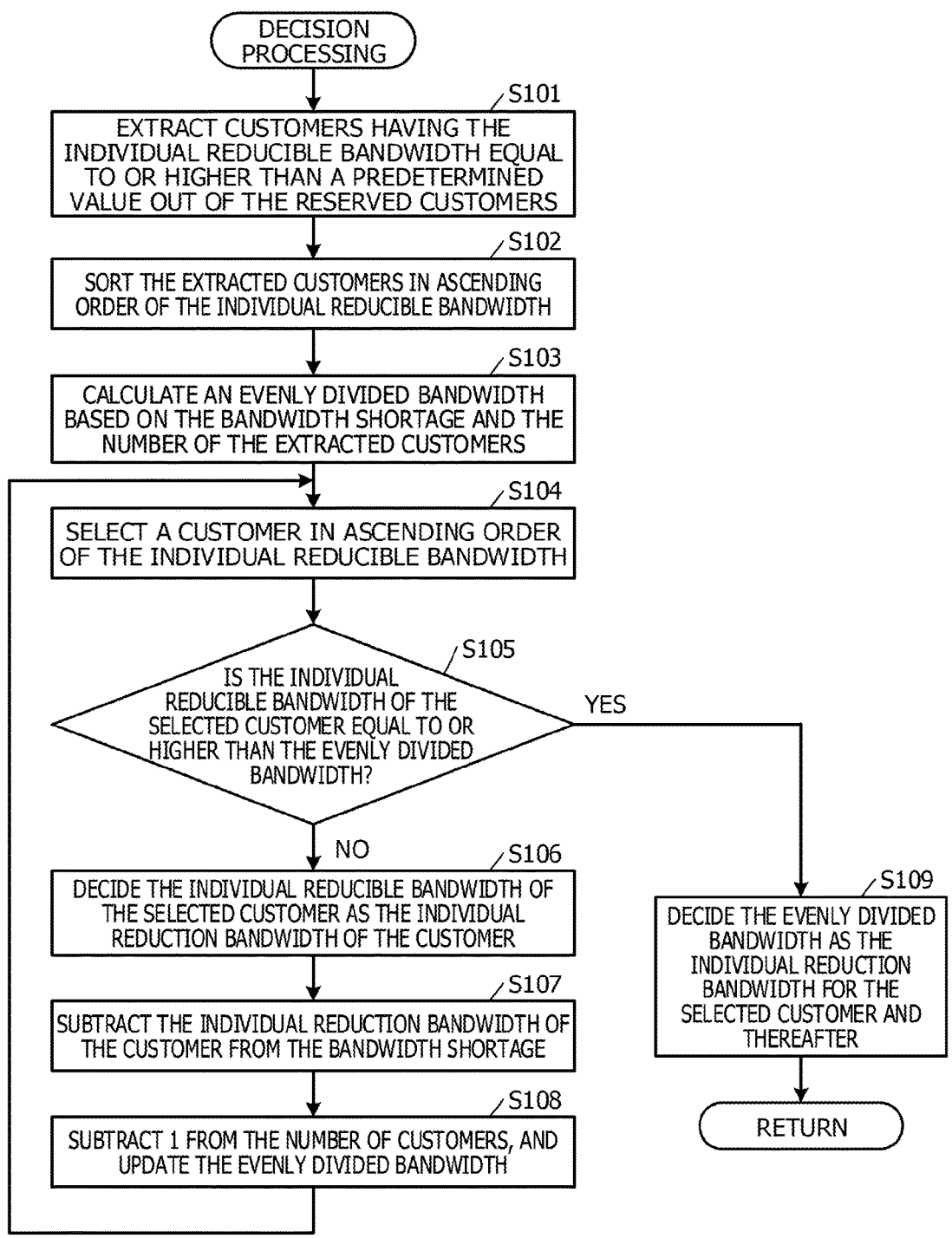
FIG. 9 is a flowchart illustrating decision processing according to the first embodiment.

When the decision instruction is input from the calculation unit 134 to the decision unit 135, the decision unit 135 executes decision processing (step S11). Here, a description will be given of the decision processing with reference to FIG. 9. FIG. 9 is a flowchart illustrating the decision processing according to the first embodiment.

The decision unit 135 extracts customers having the individual reducible bandwidth equal to or higher than a predetermined value out of the reserved customers (step S101). The decision unit 135 sorts the extracted customers in ascending order of the individual reducible bandwidth (step S102). The decision unit 135 calculates an evenly divided bandwidth based on the bandwidth shortage and the number of the extracted customers (step S103). The decision unit 135 selects a customer in ascending order of the individual reducible bandwidth (step S104). The decision unit 135 determines whether or not the individual reducible bandwidth of the selected customer is equal to or higher than the evenly divided bandwidth (step S105).

If the individual reducible bandwidth of the selected customer is not equal to or higher than the evenly divided bandwidth (step S105: negation), the decision unit 135 decides the individual reducible bandwidth of the selected customer as the individual reduction bandwidth of the customer (step S106). The decision unit 135 subtracts the individual reduction bandwidth of the customer from the bandwidth shortage (step S107). The decision unit 135 subtracts 1 from the number of customers, recalculates and updates the evenly divided bandwidth (step S108), and the processing returns to step S104.

If the individual reducible bandwidth of the selected customer is equal to or higher than the evenly divided bandwidth (step S105: affirmation), the decision unit 135 decides the evenly divided bandwidth as the individual reduction bandwidth for the selected customer and thereafter (step S109). The decision unit 135 outputs the individual reduction bandwidth of each of the decided customers to the assigning unit 136, and terminates the decision processing. The processing then returns the former processing. Thereby, the bandwidth management device 100 determines the evenly divided individual reduction bandwidth for the guaranteed bandwidth of the reserved customer.

Referring back to the bandwidth management processing in FIG. 8, when the decision unit 135 terminates the decision processing, the decision unit 135 outputs a determination instruction to the determination unit 132, and the processing returns to step S2. When the determination unit 132 has checked all the bandwidths of the time slots related to the reservation (step S2: affirmation), the determination unit 132 outputs an assigning instruction to the assigning unit 136.

When the individual reduction bandwidth of the decided each customer is input from the decision unit 135 to the assigning unit 136, and the assigning instruction is input from the determination unit 132 to the assigning unit 136, the assigning unit 136 determines whether or not the update of all the time slots have been completed (step S12).

If the update of all the time slots have not been completed (step S12: negation), the assigning unit 136 updates the bandwidth management table 121 by a new maximum guaranteed bandwidth, and generates a free bandwidth (step S13). The assigning unit 136 assigns the reservation bandwidth to the generated free bandwidth, and stores the assigned result in the bandwidth management table 121 (step S14).

The assigning unit 136 generates the guaranteed bandwidth information corresponding to each customer, and transmits the information to the switch device 50 (step S15). The assigning unit 136 calculates a new maximum guaranteed bandwidth and a charge based on the reservation bandwidth, and updates the accounting table 123 (step S16), and the processing returns to step S12.

If the update of all the time slots have been completed (step S12: affirmation), the assigning unit 136 terminates the bandwidth management processing. Thereby, the bandwidth management device 100 accepts a new reservation even if the bandwidth is filled with the reserved guaranteed bandwidth.

In this manner, when the bandwidth management device 100 accepts a bandwidth reservation from a user, the bandwidth management device 100 determines whether or not the total bandwidth of the reservation bandwidth and the guaranteed bandwidth of the reserved user exceeds the permissible upper limit value of the line in the reservation time slot. Also, if the total bandwidth exceeds the permissible upper limit value, the bandwidth management device 100 calculates the reducible bandwidth based on the bandwidth shortage produced by subtracting the permissible upper limit value from the total bandwidth, and the statistical information of the use bandwidth related to the reserved users. Also, the bandwidth management device 100 decides the reduction bandwidth from the guaranteed bandwidth based on the calculated reducible bandwidth. Also, the bandwidth management device 100 assigns the reservation bandwidth to the free bandwidth produced by reducing the decided reduction bandwidth from the guaranteed bandwidth. As a result, it is possible to accept a new reservation even if the bandwidth is filled with the reserved guaranteed bandwidth.

Also, the bandwidth management device 100 decides the individual reduction bandwidth produced by evenly dividing the reduction bandwidth for the guaranteed bandwidth of the reserved users having the individual reducible bandwidth equal to or higher than a predetermined value out of a plurality of reserved users. Also, the bandwidth management device 100 assigns the reservation bandwidth to the free bandwidth produced by reducing the respective decided individual reduction bandwidth from the guaranteed bandwidth of the reserved users having the individual reducible bandwidth equal to or higher than a predetermined value. As a result, the respective bandwidths to be reduced from the reserved users become small.

Second Embodiment

Figure 10:
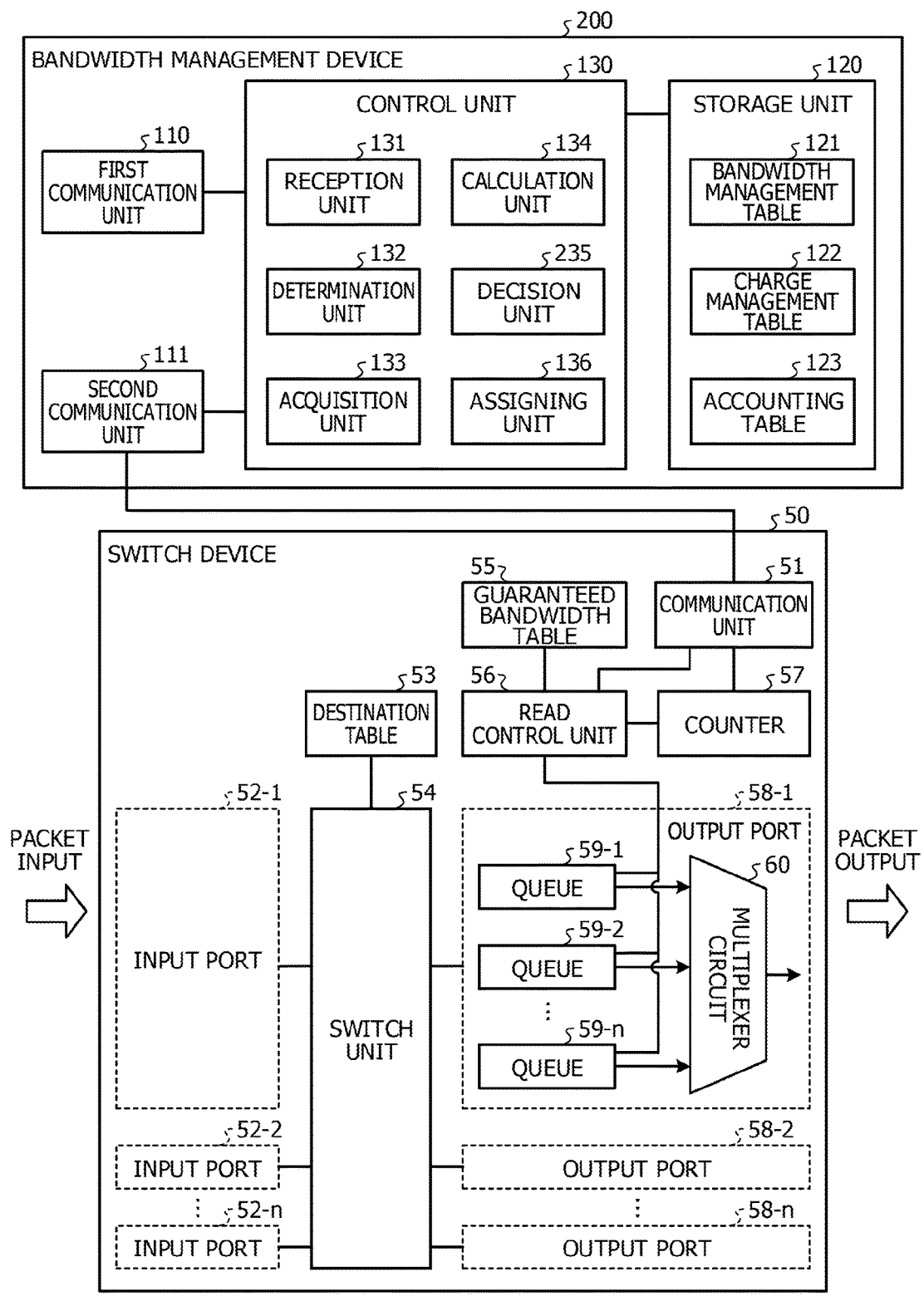
FIG. 10 illustrates an example of configurations of a bandwidth management device and a switch device according to a second embodiment.

In the above-described first embodiment, the evenly divided individual reduction bandwidth is decided for the guaranteed bandwidth of each reserved customer. However, weighting may be performed based on the individual reducible bandwidth of each reserved customer in order to decide the individual reduction bandwidth. A description will be given of an embodiment in this case as a second embodiment. FIG. 10 illustrates an example of configurations of a bandwidth management device and a switch device according to the second embodiment. In this regard, the same symbol is given to a component of the configurations of the bandwidth management device 100 and the switch device 50 in the first embodiment, and descriptions will be omitted on the duplicated configuration and operation.

A bandwidth management device 200 according to the second embodiment includes a decision unit 235 in place of the decision unit 135 in the bandwidth management device 100 according to the first embodiment.

When the decision instruction is input from the calculation unit 134 to the decision unit 235, the decision unit 235 executes decision processing for deciding a reduction bandwidth that is to be reduced from the guaranteed bandwidth of the reserved customer, that is to say, the individual reduction bandwidth from the guaranteed bandwidth of the reserved customer. When the decision instruction is input from the calculation unit 134 to the decision unit 135, the decision unit 135 extracts a customer having the individual reducible bandwidth higher than a predetermined value out of the reserved customers.

The decision unit 235 calculates the total value of the individual reducible bandwidths of the extracted customers. The decision unit 235 determines whether or not the individual reduction bandwidths have been decided for all the extracted customers. If the individual reduction bandwidths of not all the extracted customers have been decided, the decision unit 235 calculates weights of the extracted customers in order. The decision unit 235 obtains the weight for each customer by the following expression, for example. The weight=(the individual reducible bandwidth/the total value of the individual reducible bandwidths).

The decision unit 235 decides the individual reduction bandwidth of the extracted customer in order based on the calculated weight. The decision unit 235 obtains the individual reduction bandwidth by the following expression, for example. The individual reduction bandwidth=(the maximum guaranteed bandwidth−bandwidth shortage×weight). If the individual reduction bandwidths of all the extracted customers have been decided, the decision unit 235 outputs the individual reduction bandwidth of each decided customer to the assigning unit 136, and terminates the decision processing. That is to say, the decision unit 235 performs weighting of the guaranteed bandwidths of the reserved customers having the individual reducible bandwidth equal to or higher than a predetermined value based on the individual reducible bandwidth out of a plurality of reserved customers, and decides the individual reduction bandwidth. Also, when the decision unit 235 terminates the decision processing, the decision unit 235 outputs the determination instruction to the determination unit 132.

Figure 11:
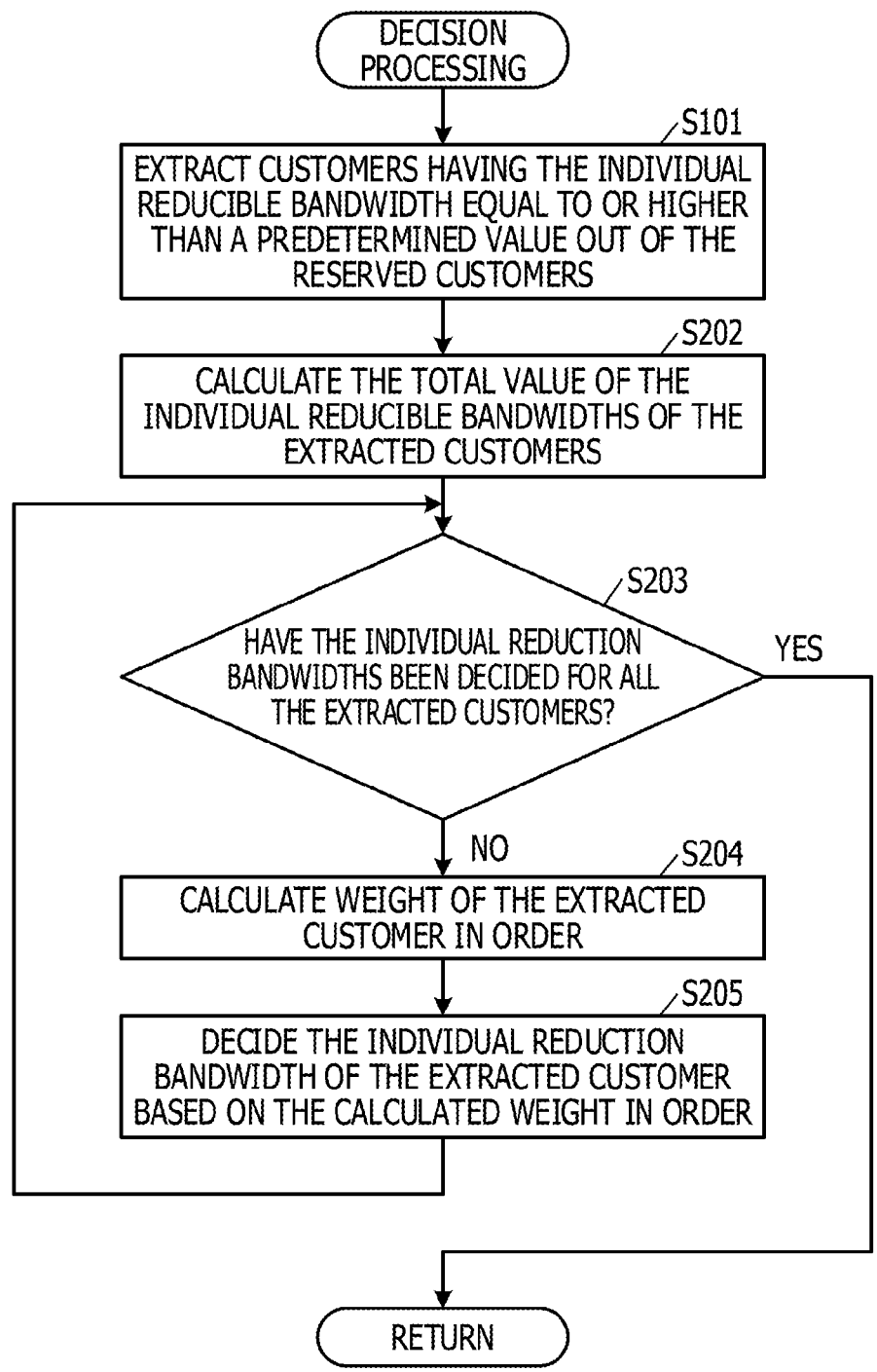
FIG. 11 is a flowchart illustrating decision processing according to the second embodiment.

Next, a description will be given of the operation of the bandwidth management device 200 according to the second embodiment. In the second embodiment, compared with the bandwidth management processing in the first embodiment, the decision processing is different, but the other processing is the same as the processing in the first embodiment. Accordingly, a description will be given of the decision processing, and the descriptions of the other processing are omitted. FIG. 11 is a flowchart illustrating the decision processing according to the second embodiment.

The decision unit 235 extracts customers having the individual reducible bandwidth equal to or higher than a predetermined value out of the reserved customers (step S101). The decision unit 235 calculates the total value of the individual reducible bandwidths of the extracted customers (step S202). The decision unit 235 determines whether or not the individual reduction bandwidths have been decided for all the extracted customers (step S203). If the individual reduction bandwidths of not all the extracted customers have been decided (step S203: negation), the decision unit 235 calculates weight of the extracted customer in order (step S204). The decision unit 235 decides the individual reduction bandwidth of the extracted customer based on the calculated weight in order (step S205), and the processing returns to step S203.

If the decision unit 235 has decided the individual reduction bandwidths of all the extracted customers (step S203: affirmation), the decision unit 235 outputs the individual reduction bandwidth of each decided customers to the assigning unit 136, terminates the decision processing, and returns to the former processing. Thereby, the bandwidth management device 200 decides the individual reduction bandwidth in accordance with the size of the individual reducible bandwidth.

In this manner, the bandwidth management device 200 performs weighting based on the individual reducible bandwidth on the guaranteed bandwidth of the reserved user having the individual reducible bandwidth equal to or higher than a predetermined value out of a plurality of reserved users in order to decide the individual reduction bandwidth. Also, the bandwidth management device 200 assigns the reservation bandwidth to a free bandwidth produced by reducing the individual decided reduction bandwidth from the guaranteed bandwidth of the reserved user having the individual reducible bandwidth equal to or higher than a predetermined value. As a result, the individual reduction bandwidth in accordance with the size of the individual reducible bandwidth is decided.

Third Embodiment

Figure 12:
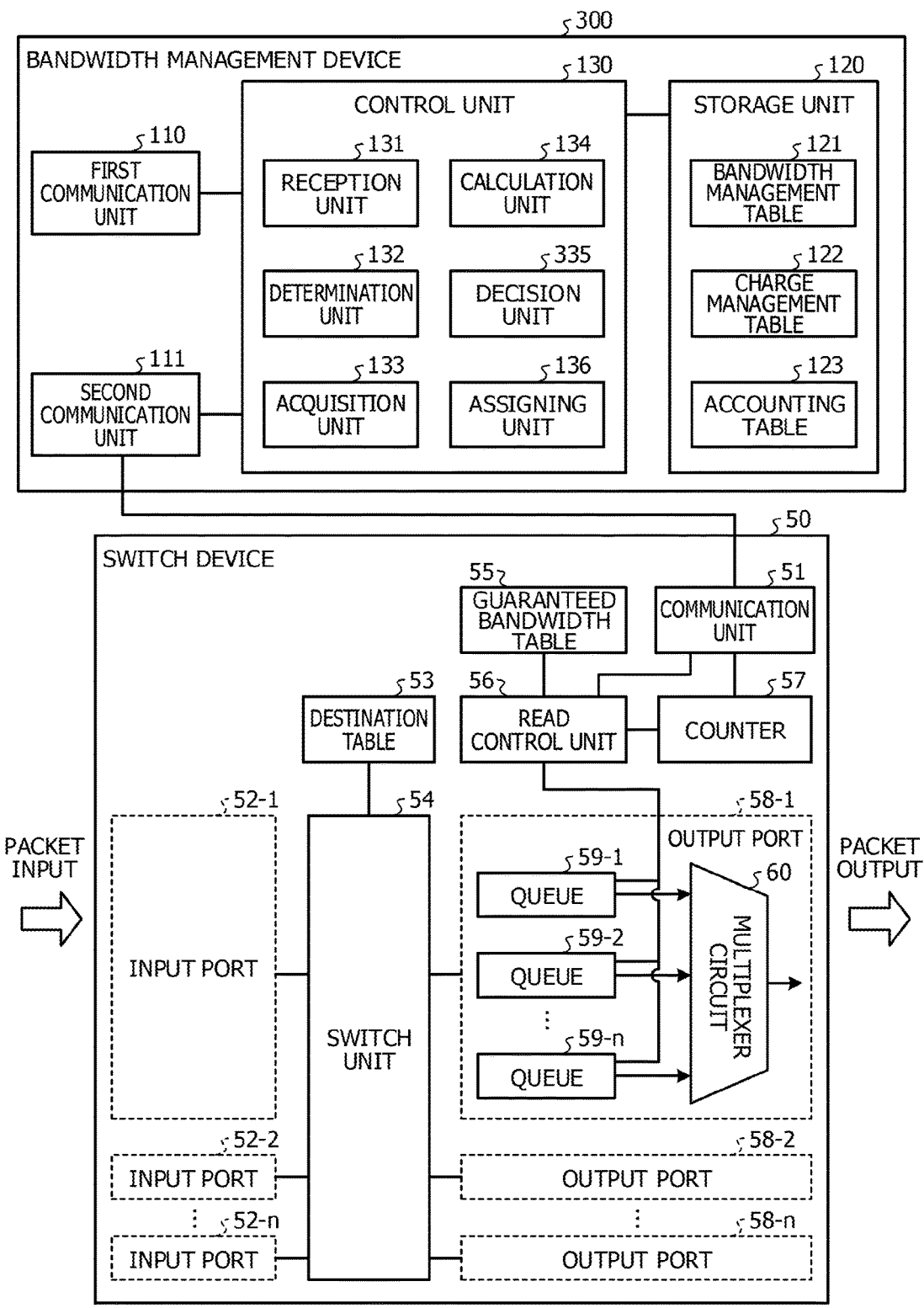
FIG. 12 illustrates an example of configurations of a bandwidth management device and a switch device according to a third embodiment.

In the above-described first embodiment, the evenly divided individual reduction bandwidth is decided for the guaranteed bandwidth of each reserved customer. However, the individual reduction bandwidth may be decided so as to minimize the total amount of the charges reduced from each of the reserved customers. A description will be given of an embodiment in this case as a third embodiment. FIG. 12 illustrates an example of configurations of a bandwidth management device and a switch device according to the third embodiment. In this regard, the same symbol is given to a component of the configurations of the bandwidth management device 100 and the switch device 50 in the first embodiment, and descriptions will be omitted on the duplicated configuration and operation.

A bandwidth management device 300 according to the third embodiment includes a decision unit 335 in place of the decision unit 135 in the bandwidth management device 100 according to the first embodiment.

When the decision instruction is input from the calculation unit 134 to the decision unit 335, the decision unit 335 executes decision processing for deciding a reduction bandwidth that is to be reduced from the guaranteed bandwidth of the reserved customer, that is to say, the individual reduction bandwidth from the guaranteed bandwidth of the reserved customer. When the decision instruction is input from the calculation unit 134 to the decision unit 335, the decision unit 335 extracts a customer having the individual reducible bandwidth higher than a predetermined value out of the reserved customers.

The decision unit 335 sorts the extracted customers in descending order of the maximum value of the guaranteed bandwidth. The decision unit 335 sets the number of the extracted customers to N, and a variable for counting the number of customers J=1. The decision unit 335 determines whether or not the variable J is equal to or higher than the number of the extracted customers N. If the variable J is not equal to or higher than the number of the extracted customers N, the decision unit 335 calculates the total value of the individual reducible bandwidths up to the J-th customer as the reducible bandwidth. The decision unit 335 determines whether or not the reducible bandwidth exceeds the bandwidth shortage. If the reducible bandwidth does not exceed the bandwidth shortage, the decision unit 335 increments the variable J, and returns the determination as to whether the variable J is equal to or higher than the number of the extracted customers N. That is to say, the decision unit 335 calculates the total value of the individual reducible bandwidths up to the J-th customer as the reducible bandwidth, and repeats the determination as to whether or not the reducible bandwidth exceeds the bandwidth shortage.

If the reducible bandwidth exceeds the bandwidth shortage, the decision unit 335 determines whether or not a charge to be reduced as far as the J-th customer has been calculated. If a charge to be reduced as far as the J-th customer has not been calculated, the decision unit 335 calculates a weight of as far as the J-th customer in order. The decision unit 335 calculates a weight for each customer by the following expression, for example. Weight=(the individual reducible bandwidth/the total value of the individual reducible bandwidths)

The decision unit 335 calculates a charge to be reduced as far as the J-th customer in order based on the calculated weight. The decision unit 335 first calculates a tentative individual reduction bandwidth. The decision unit 335 calculates the tentative individual reduction bandwidth by the following expression, for example. Tentative individual reduction bandwidth=(the maximum guaranteed bandwidth−bandwidth shortage×weight) The decision unit 335 refers to the charge management table 122, for example, and calculates a charge in the case of reducing the tentative individual reduction bandwidth from the maximum guaranteed bandwidth. The decision unit 335 calculates a charge to be reduced by subtracting the calculated charge from the charge of the maximum guaranteed bandwidth.

When the decision unit 335 has calculated the total of the charges to be reduced as far as the J-th customer, the decision unit 335 temporarily stores the total of the charge to be reduced as far as the calculated J-th customer in the storage unit 120 as the total of charges to be reduced in the case of the number of customers J each time the variable J changes. Also, the decision unit 335 temporarily stores the calculated weight for each customer in the storage unit 120 together with the total of the charges to be reduced in the case of the number of customers J. The decision unit 335 increments the variable J, and returns to the determination of whether the variable J is equal to or larger than the number of the extracted customers N. That is to say, the decision unit 335 repeats the calculation of the total of charges to be reduced from as far as the J-th customer by incrementing the variable J.

If the variable J is equal to or larger than the number of the extracted customers N, the decision unit 335 selects the number of customers J that minimalizes the total of the charges to be reduced out of the totals of the charges to be reduced in respective cases of the number of customers J, which are temporarily stored in the storage unit 120. The decision unit 335 decides the individual reduction bandwidth based on the weight calculated for the guaranteed bandwidth of each customer corresponding to the number of selected customers J, that is to say, the weight that is temporarily stored in the storage unit 120 with the charge to be reduced. The decision unit 335 outputs the individual reduction bandwidth of each of the decided customers to the assigning unit 136, and terminates the decision processing.

Also, when the decision processing is terminated, the decision unit 335 outputs the determination instruction to the determination unit 132.

That is to say, the decision unit 335 arranges the reserved customers having the individual reducible bandwidth equal to or higher than a predetermined value in descending order of the maximum value of the guaranteed bandwidth out of a plurality of reserved customers. The decision unit 335 changes the number of higher reserved customers in a range in which total value of the individual reducible bandwidths of the reserved customers exceeds the reservation bandwidth, performs weighting based on the individual reducible bandwidth, and calculates a charge to be reduced from the reserved customer. The decision unit 335 selects the number of the reserved customers having the minimum total of charges to be reduced. The decision unit 335 performs weighting on the guaranteed bandwidth of each of the reserved customers corresponding to the number of the selected reserved customers based on the individual reducible bandwidth, and decides the individual reduction bandwidth.

Figure 13:
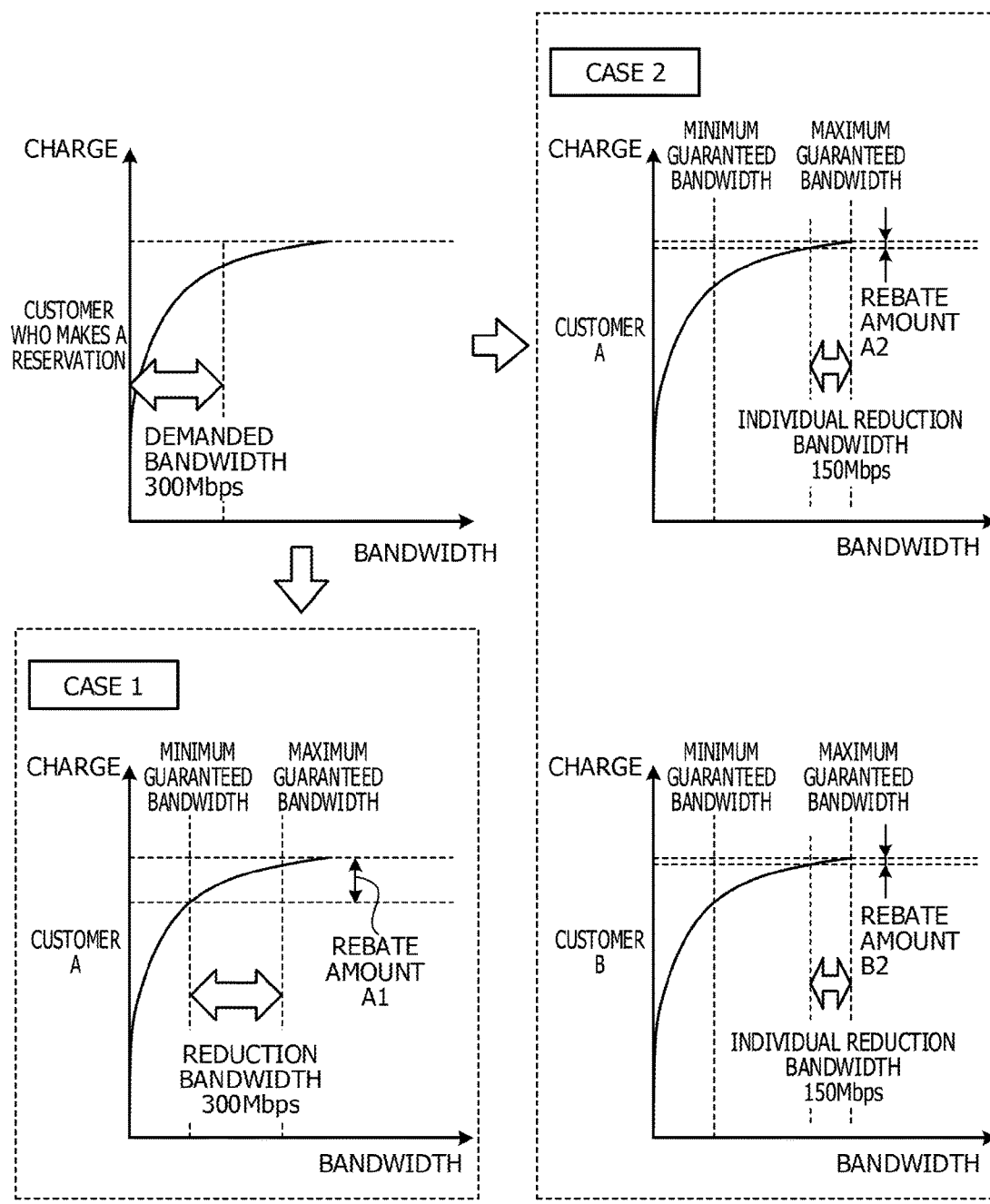
FIG. 13 is a diagram for explaining the case where the total charge to be reduced becomes minimum.

Here, a description will be given of the case where a charge to be reduced becomes minimum using FIG. 13. FIG. 13 is a diagram for explaining the case where the total charge to be reduced becomes minimum. As illustrated in FIG. 13, if it is assumed that a customer who makes a reservation demands a bandwidth of 300 Mbps, and the line is reserved up to the permissible upper limit value, the bandwidth shortage becomes 300 Mbps. In the case of "case 1", the bandwidth shortage is filled with the reduction bandwidth produced by reducing the guaranteed bandwidth for one customer A, and thus a charge to be reduced becomes the rebate amount A1 based on the charge graph. In contrast, in the case of "case 2", the bandwidth shortage is filled with the individual reduction bandwidths produced from the respective guaranteed bandwidths for two customers A and B, and a charge to be reduced becomes the rebate amount A2+the rebate amount B2 based on the charge graph. In the example in FIG. 13, if "case 1" and "case 2" are compared, the rebate amount A1>(the rebate amount A2+the rebate amount B2). Thus, "case 2" is the case where the total of charge to be reduced becomes minimum.

Figure 14:
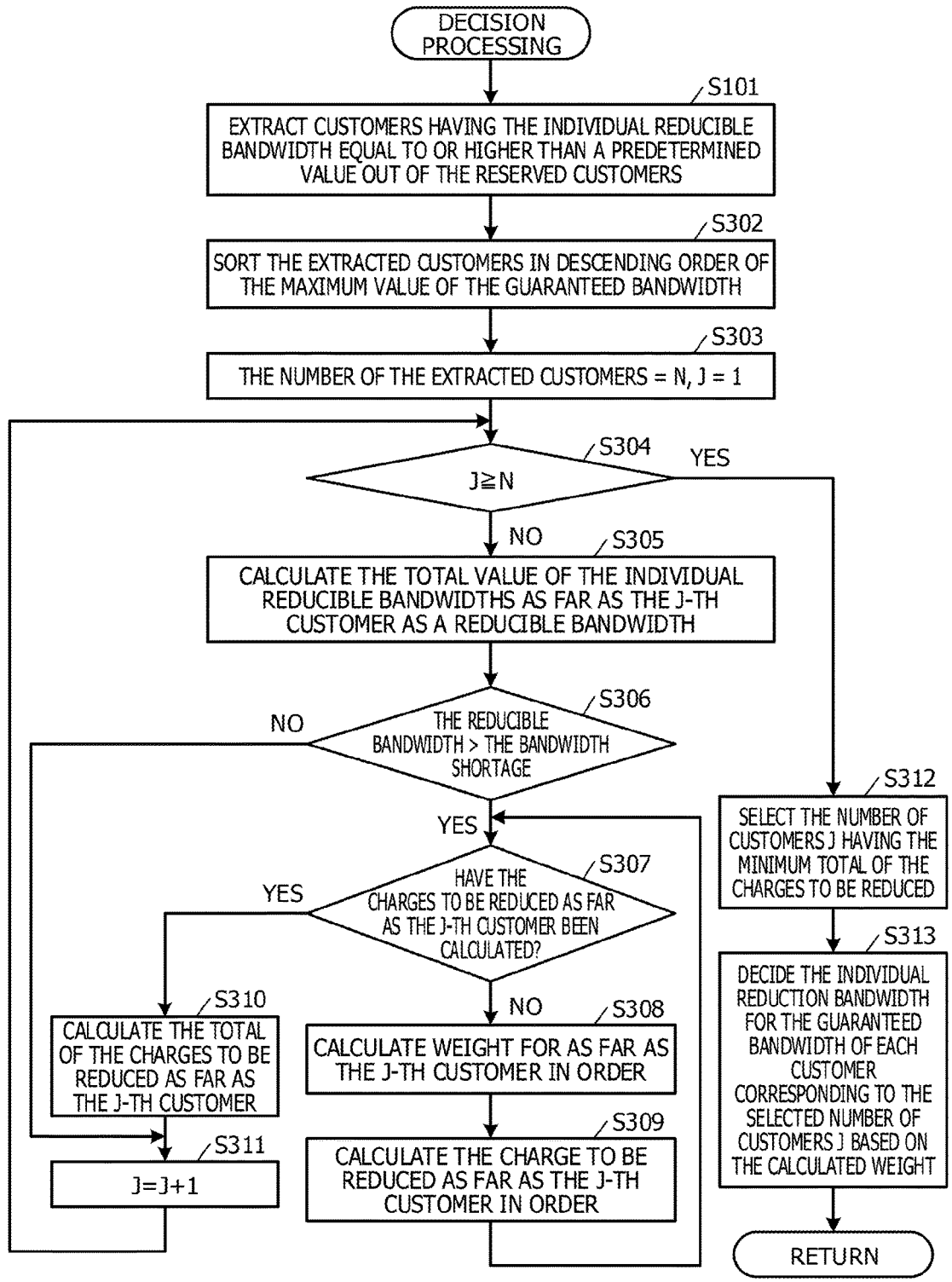
FIG. 14 is a flowchart illustrating decision processing according to the third embodiment.

Next, a description will be given of operation of a bandwidth management device 300 according to a third embodiment. In the third embodiment, compared with the bandwidth management processing according to the first embodiment, the decision processing is different, but the other processing is the same as that in the first embodiment. Accordingly, a description will be given of the decision processing, and the description of the other processing is omitted. FIG. 14 is a flowchart illustrating decision processing according to the third embodiment.

The decision unit 335 extract customers having the individual reducible bandwidth equal to or higher than a predetermined value out of the reserved customers (step S101). The decision unit 335 sorts the extracted customers in descending order of the maximum value of the guaranteed bandwidth (step S302). The decision unit 335 sets the number of the extracted customers to N, and the variable for counting the number of customers J=1 (step S303). The decision unit 335 determines whether or not the variable J is equal to or higher than the number of the extracted customers N (step S304).

If the variable J is not equal to or higher than the number of the extracted customers N (step S304: negation), the decision unit 335 calculates the total value of the individual reducible bandwidths as far as the J-th customer as a reducible bandwidth (step S305). The decision unit 335 determines whether or not the reducible bandwidth exceeds the bandwidth shortage (step S306). If the reducible bandwidth does not exceeds the bandwidth shortage (step S306: negation), the decision unit 335 increments the variable J (step S311), and the processing returns to step S304.

If the reducible bandwidth exceeds the bandwidth shortage (step S306: affirmation), the decision unit 335 determines whether or not the charges to be reduced as far as the J-th customer have been calculated (step S307). If the charges to be reduced as far as the J-th customer have not been calculated (step S307: negation), the decision unit 335 calculates weight as far as the J-th customer in order (step S308). The decision unit 335 calculates the charge to be reduced as far as the J-th customer in order based on the calculated weights (step S309), and the processing returns to step S307.

If the charges to be reduced as far as the J-th customer have been calculated (step S307: affirmation), the decision unit 335 calculates the total of the charges to be reduced as far as the J-th customer (step S310). The decision unit 335 increments the variable J (step S311), and the processing returns to step S304.

If the variable J is equal to or larger than the number of the extracted customers N (step S304: affirmation), the decision unit 335 selects the number of customers J having the minimum total of the charges to be reduced out of the totals of the charges to be reduced in the cases of the respective number of customers J (step S312). The decision unit 335 decides the individual reduction bandwidth for the guaranteed bandwidth of each customer corresponding to the selected number of customers J based on the calculated weight (step S313). The decision unit 335 outputs the individual reduction bandwidth of each of the decided customers to the assigning unit 136, and the processing returns to the former processing. Thereby, the bandwidth management device 300 decides the individual reduction bandwidth such that the total of the charges to be reduced from each of the reserved customers is minimized.

In this manner, the bandwidth management device 300 arranges the reserved users having the individual reducible bandwidth equal to or higher than a predetermined value in descending order of the maximum value of the guaranteed bandwidth out of a plurality of reserved users. Also, the bandwidth management device 300 changes the higher number of reserved users in a range in which the total value of the individual reducible bandwidths of the reserved users exceeds the reservation bandwidth, performs weighting based on the individual reducible bandwidth, and calculates the charge to be reduced from the reserved user. Also, the bandwidth management device 300 selects the number of reserved users having the minimum total of the charges to be reduced. Also, the bandwidth management device 300 performs weighting on the guaranteed bandwidth of each of the reserved users corresponding to the number of selected reserved users based on the individual reducible bandwidth, and decides the individual reduction bandwidth. Also, the bandwidth management device 300 assigns the reservation bandwidth to the free bandwidth produced by reducing the respectively decided individual reduction bandwidths from the guaranteed bandwidth of the reserved users having the individual reducible bandwidth equal to or higher than a predetermined value. As a result, the individual reduction bandwidth is decided such that the total of the charges to be reduced from each of the reserved users is minimized.

Fourth Embodiment

Figure 15:
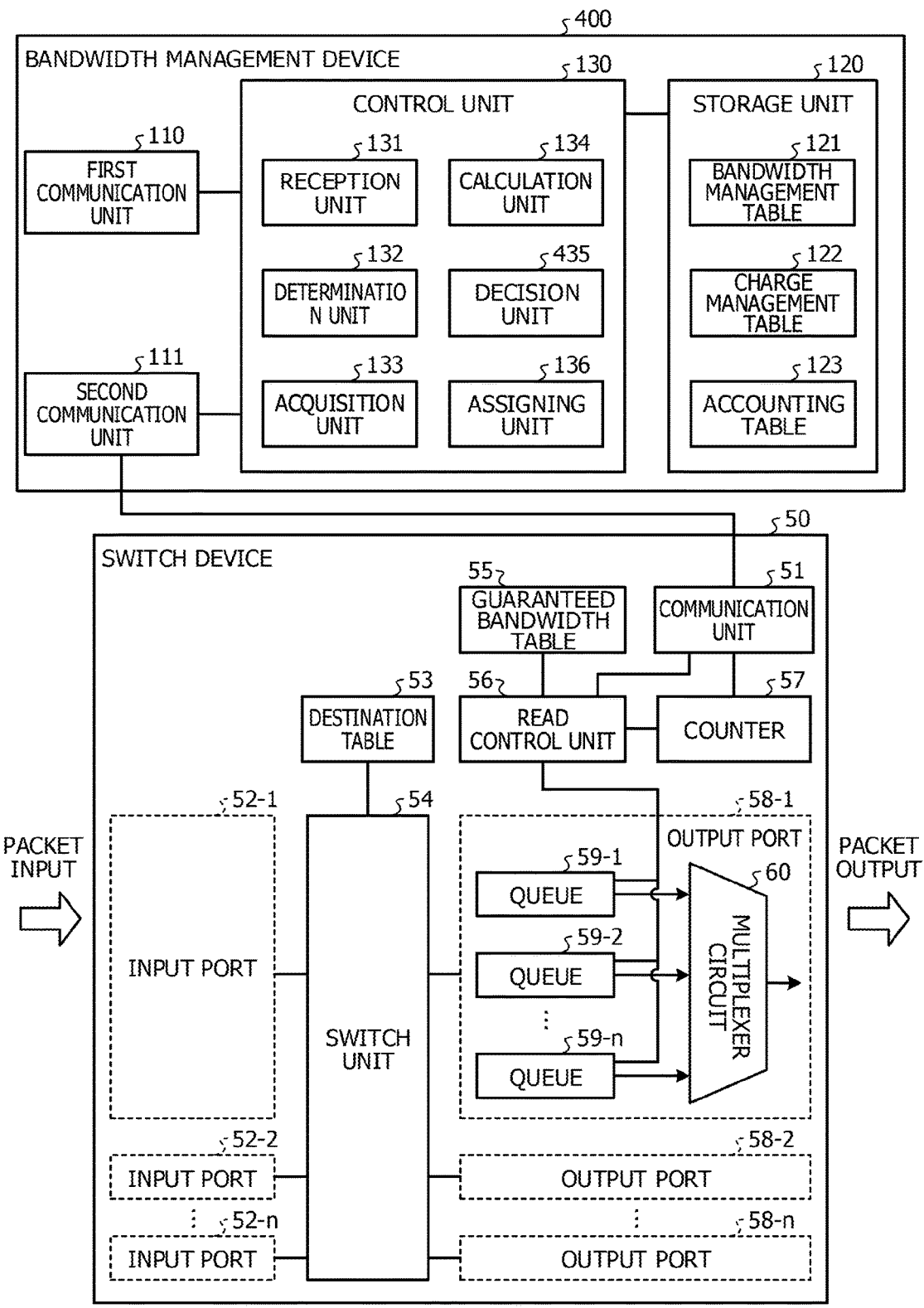
FIG. 15 illustrates an example of configurations of a bandwidth management device and a switch device according to a fourth embodiment.

In the above-described first embodiment, the evenly divided individual reduction bandwidth is decided for each of the reserved customers. However, a bandwidth auction may be carried out in order to decide the individual reduction bandwidth from each of the reserved customers by bidding. A description will be given of an embodiment in this case as a fourth embodiment. FIG. 15 illustrates an example of configurations of a bandwidth management device and a switch device according to the fourth embodiment. In this regard, the same symbol is given to a component of the configurations of the bandwidth management device 100 and the switch device 50 in the first embodiment, and descriptions will be omitted on the duplicated configuration and operation.

A bandwidth management device 400 according to the fourth embodiment includes a decision unit 435 in place of the decision unit 135 in the bandwidth management device 100 according to the first embodiment.

Figure 16:
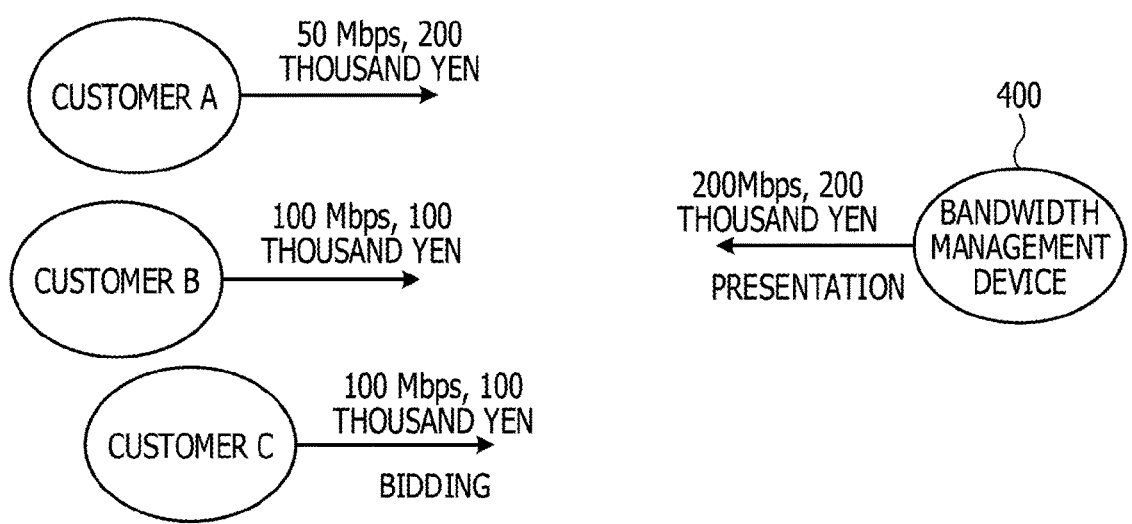
FIG. 16 illustrates an example of a bandwidth auction.

Here, a description will be given of a bandwidth auction using FIG. 16. FIG. 16 illustrates an example of a bandwidth auction. As illustrated in FIG. 16, in the bandwidth auction, the bandwidth management device 400 presents a bandwidth shortage of 200 Mbps and a reduction budget of 200 thousand yen to reserved customers A, B, and C as a condition. The customer A bids an individual reducible bandwidth of 50 Mbps and a desired reduction amount of 200 thousand yen for the presented condition. The customer B bids an individual reducible bandwidth of 100 Mbps and a desired reduction amount of 100 thousand yen for the presented condition. The customer C bids an individual reducible bandwidth of 100 Mbps and a desired reduction amount of 100 thousand yen for the presented condition. The bandwidth management device 400 decides customers whose bandwidths are to be reduced for the bandwidth shortage of 200 Mbps and the individual reduction bandwidths of the customers in ascending order of the unit price based on these bid results, for example.

Referring back to FIG. 15, when a decision instruction is input from the calculation unit 134 to the decision unit 435, the decision unit 435 performs decision processing for deciding reduction bandwidths that are reduced from the guaranteed bandwidths of the reserved customers, that is to say, the respective individual reduction bandwidths that are reduced from the guaranteed bandwidths of the reserved customers. When the decision instruction is input from the calculation unit 134 to the decision unit 435, the decision unit 435 transmits the bandwidth shortage and the reduction budget for each of the reserved customers to the information processing unit of each of the reserved customers via the first communication unit 110. The reduction budget is the amount of money allowed to be provided by subtracting the bandwidth shortage from the guaranteed bandwidth of each of the reserved customers.

The decision unit 435 receives and collects bid information including the individual reducible bandwidth and the desired reduction amount from the information processing unit of each of the reserved customers via the first communication unit 110. The decision unit 435 calculates a unit price of the individual reducible bandwidth for each reserved customer based on the bid information. The decision unit 435 sorts the individual reducible bandwidths of the individual reserved customers in ascending order of the calculated unit price. The decision unit 435 accumulates the individual reducible bandwidths in ascending order of the unit price. The decision unit 435 determines whether or not the accumulated individual reducible bandwidth exceeds the bandwidth shortage. If the accumulated individual reducible bandwidth does not exceed the bandwidth shortage, the decision unit 435 further performs accumulation.

If the accumulated individual reducible bandwidth exceeds the bandwidth shortage, the decision unit 435 determines whether or not bidding has been performed a predetermined number of times. In this regard, a predetermined number of times is three times, for example. If bidding has not been performed a predetermined number of times, the decision unit 435 determines whether or not there is a desired reduction amount lower than that of the previous time. That is to say, the decision unit 435 calculates the unit price of the individual reducible bandwidth, and determines whether or not there is a unit price lower than that of the previous time. If there is a desired reduction amount lower than that of the previous time, the decision unit 435 transmits and notifies bid results to the information processing unit of each of the reserved customers via the first communication unit 110, and requests a rebid. In this regard, the decision unit 435 may change the bandwidth shortage and the reduction budget that are presented at the time of rebid.

If bidding has been performed a predetermined number of times, or there are no desired reduction amounts lower than that of the previous time, the decision unit 435 transmits and notifies the bid result to the information processing unit of each of the reserved customers via the first communication unit 110. The decision unit 435 decides the individual reduction bandwidth based on the bid result. The decision unit 435 outputs the individual reduction bandwidth to each of the decided customers to the assigning unit 136 and terminates the decision processing. Also, when the decision processing is terminated, the decision unit 435 outputs a determination instruction to the determination unit 132. In this regard, when the decision unit 435 receives statistical information from the information processing unit of each of the reserved customers, the decision unit 435 obtains the statistical information from the bandwidth management table 121 and transmits the obtained statistical information to the information processing unit of each of the reserved customers.

That is to say, the decision unit 435 presents the bandwidth shortage and the reduction budget that are capable of being provided by subtracting the bandwidth shortage from the guaranteed bandwidth to a plurality of reserved customers. The decision unit 435 collects the bid information including the individual reducible bandwidth and the desired reduction amount from respective reserved customers. The decision unit 435 calculates the unit price of the individual reducible bandwidth for each reserved customer, and accumulates the individual reducible bandwidth in ascending order to the calculated unit price. If the accumulated individual reducible bandwidth exceeds the bandwidth shortage, the decision unit 435 determines the accumulated result to be a bid result, and decides the individual reduction bandwidth for the guaranteed bandwidth of the reserved customer based on the bid result.

Figure 17:
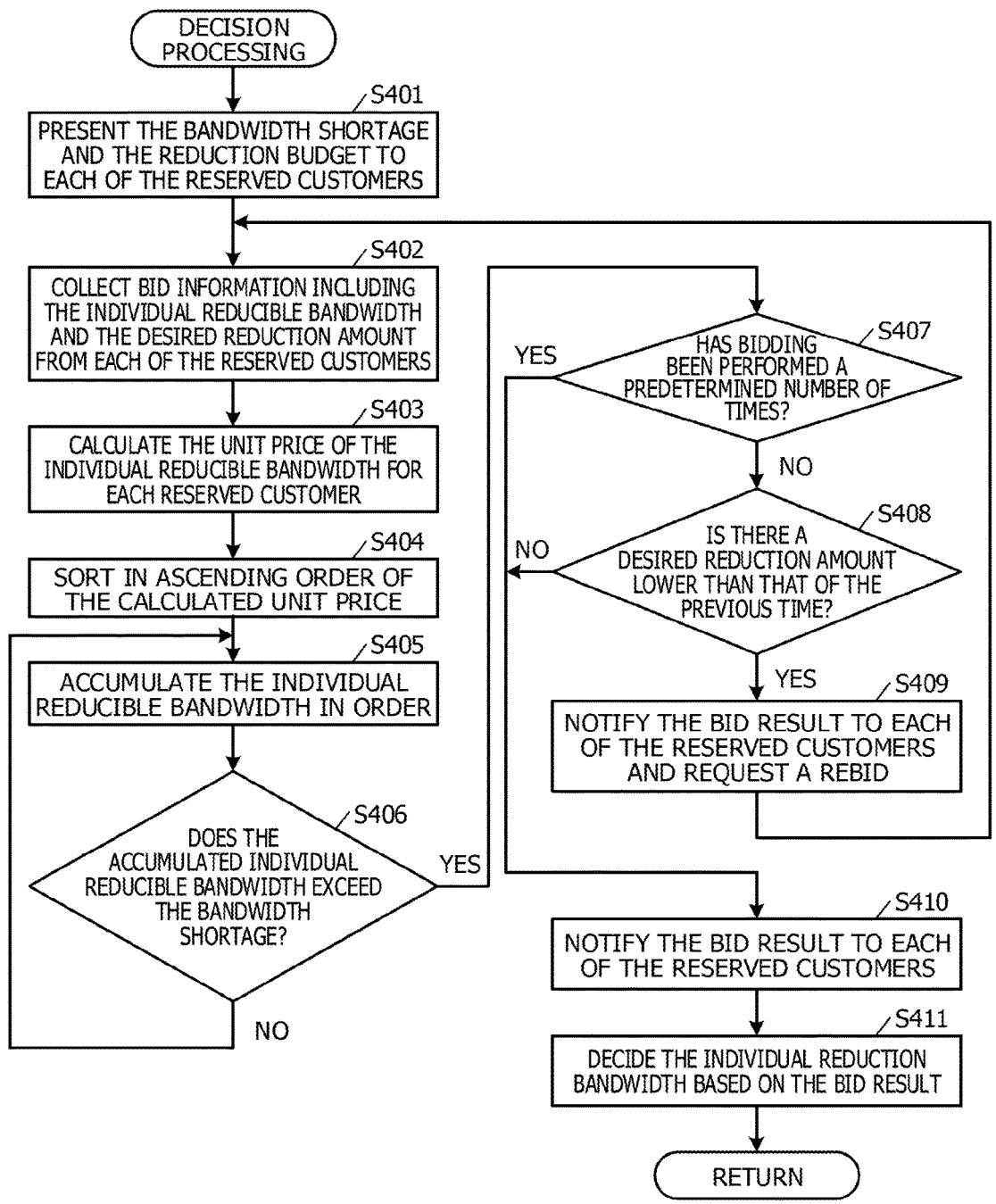
FIG. 17 is a flowchart illustrating decision processing according to the fourth embodiment.

Next, a description will be given of operation of the bandwidth management device 400 according to the fourth embodiment. In the fourth embodiment, compared with the bandwidth management processing according to the first embodiment, the decision processing is different, but the other processing is the same as that in the first embodiment. Accordingly, a description will be given of the decision processing, and the description of the other processing is omitted. FIG. 17 is a flowchart illustrating decision processing according to the fourth embodiment.

The decision unit 435 transmits the bandwidth shortage and the reduction budget to the information processing unit of each of the reserved customers, and presents them to each of the reserved customers (step S401). The decision unit 435 receives and collects bid information including the individual reducible bandwidth and the desired reduction amount from the information processing unit of each of the reserved customers (step S402). The decision unit 435 calculates the unit price of the individual reducible bandwidth for each reserved customer based on the bid information (step S403).

The decision unit 435 sorts the individual reducible bandwidths of the individual reserved customers in ascending order of the calculated unit price (step S404). The decision unit 435 accumulates the individual reducible bandwidth in order from the side of lower unit price (step S405). The decision unit 435 determines whether or not the accumulated individual reducible bandwidth exceeds the bandwidth shortage (step S406). If the accumulated individual reducible bandwidth does not exceeds the bandwidth shortage (step S406: negation), the processing of the decision unit 435 returns to step S405.

If the accumulated individual reducible bandwidth exceeds the bandwidth shortage (step S406: affirmation), the decision unit 435 determines whether or not bidding has been performed a predetermined number of times (step S407). If bidding has not been performed a predetermined number of times (step S407: negation), the decision unit 435 determines whether or not there is a desired reduction amount lower than that of the previous time (step S408). If there is a desired reduction amount lower than that of the previous time (step S408: affirmation), the decision unit 435 transmits and notifies the bid result to the information processing unit to each of the reserved customers, requests a rebid (step S409), and the processing returns to step S402.

If bidding has been performed a predetermined number of times (step S407: affirmation), or there are no desired reduction amounts lower than that of the previous time (step S408: negation), the decision unit 435 transmits and notifies the bid result to the information processing unit to each of the reserved customers (step S410). The decision unit 435 decides the individual reduction bandwidth based on the bid result (step S411). The decision unit 435 outputs the individual reduction bandwidth of each decided customer to the assigning unit 136, and the processing returns to the former processing. Thereby, the bandwidth management device 400 decides the individual reduction bandwidth based on the bid information of each reserved customer.

Figure 18:
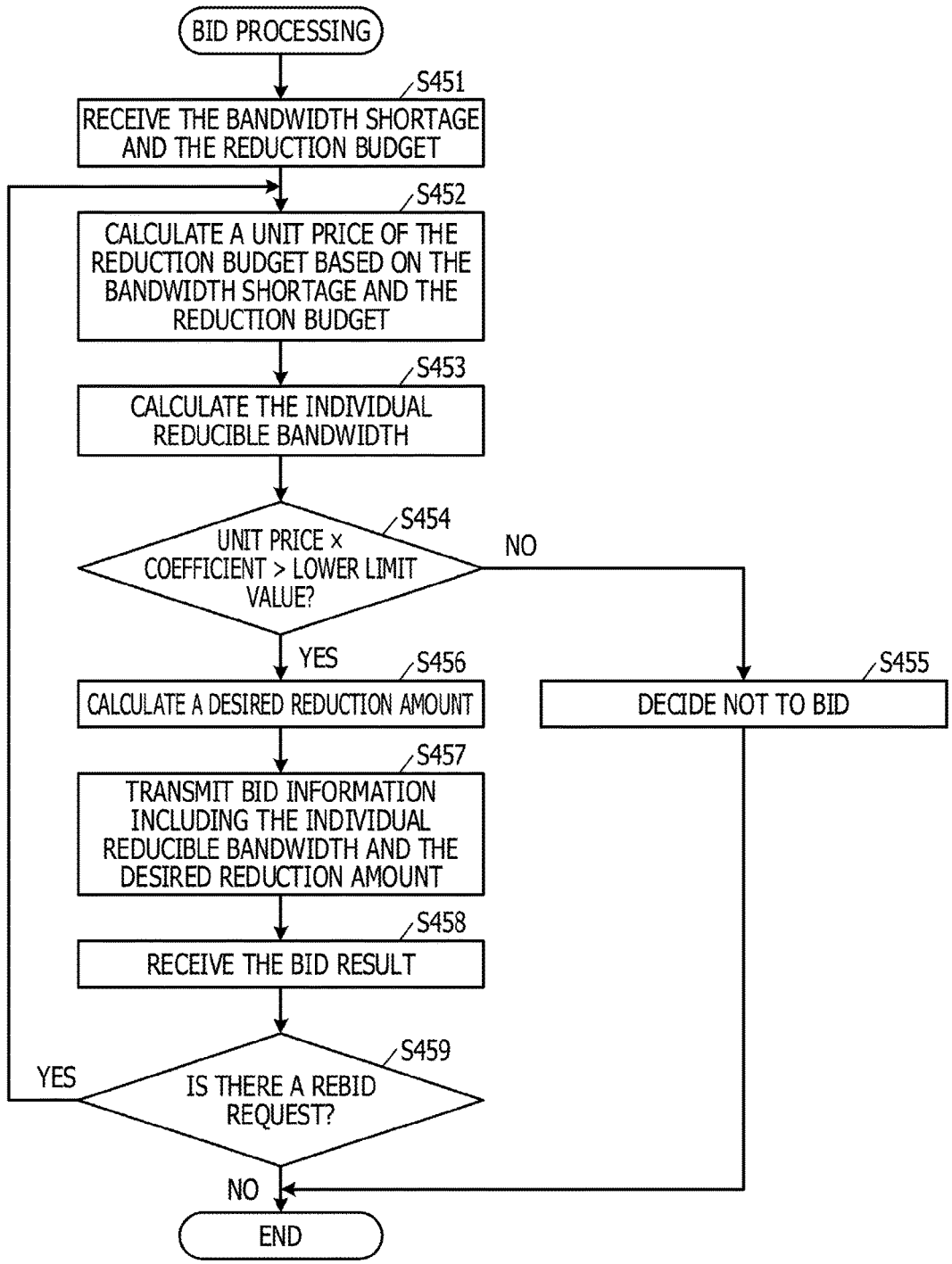
FIG. 18 is a flowchart illustrating bid processing according to the fourth embodiment.

Next, a description will be given of operation of the information processing unit of a customer who makes a bid for a bandwidth auction. FIG. 18 is a flowchart illustrating the bid processing according to the fourth embodiment. In this regard, in the following description, the information processing unit of a customer who makes a bid for a bandwidth auction is expressed as the information processing unit of a customer.

The information processing unit of a customer receives the bandwidth shortage and the reduction budget from the bandwidth management device 400 (step S451). The information processing unit of the customer calculates a unit price of the reduction budget based on the received bandwidth shortage and the reduction budget (step S452). The information processing unit of the customer demands and obtains statistical information of itself from the bandwidth management device 400. The information processing unit of the customer calculates the individual reducible bandwidth based on the obtained statistical information, and the maximum guaranteed bandwidth and the minimum guaranteed bandwidth based on the contract (step S453).

Based on the lower limit value of the unit price of the reduction budget, which is set in advance, and a coefficient indicating what percentage below the presented unit price a bid is made, the information processing unit of the customer determines whether or not the product of the unit price of the reduction budget and the coefficient exceeds the lower limit value (step S454). If the product of the unit price of the reduction budget and the coefficient exceeds the lower limit value (step S454: affirmation), the information processing unit of the customer calculates the desired reduction amount by multiplying the individual reducible bandwidth, the unit price of the reduction budget, and the coefficient (step S456).

The information processing unit of the customer transmits bid information including the individual reducible bandwidth and the desired reduction amount to the bandwidth management device 400 (step S457). The information processing unit of the customer receives the bid result from the bandwidth management device 400 (step S458). The information processing unit of the customer determines whether or not there is a rebid request for the bid result (step S459). If there is a rebid request for the bid result (step S459: affirmation), the processing in the information processing unit of the customer returns to step S452. If there are no rebid request for the bid result (step S459: negation), the information processing unit of the customer terminates the bid processing.

If the product of the unit price of the reduction budget and the coefficient does not exceed the lower limit value (step S454: negation), the information processing unit of the customer decides not to bid (step S455), and terminates the bid processing. In this manner, the information processing unit of the customer makes a bid for the bandwidth auction.

In this manner, the bandwidth management device 400 presents the bandwidth shortage and the reduction budget that is allowed to be provided by subtracting the bandwidth shortage from the guaranteed bandwidth to a plurality of reserved users. Also, the bandwidth management device 400 collects bid information including the individual reducible bandwidth and the desired reduction amount from each of the reserved users. Also, the bandwidth management device 400 calculates a unit price of the individual reducible bandwidth for each reserved user, and accumulates the individual reducible bandwidth in ascending order of the calculated unit price. Also, if the accumulated individual reducible bandwidth exceeds the bandwidth shortage, the bandwidth management device 400 determines the accumulated result to be a bid result, and decides the individual reduction bandwidth for the guaranteed bandwidth of the reserved user based on the bid result. Also, the bandwidth management device 400 assigns the reservation bandwidth to the free bandwidth produced by reducing the individual reduction bandwidths that are respectively decided from the guaranteed bandwidths of the reserved users based on the bid result. As a result, the individual reduction bandwidth is decided based on the bid information from each of the reserved users.

In this regard, in the above-described fourth embodiment, the bandwidth management device 400 has made an adjustment between the reserved customers and the customer who makes a new reservation. However, the present disclosure is not limited to this. For example, in the case of the occurrence of a bandwidth shortage, a customer who makes a reservation may select a bandwidth reduced from the bid information of the reserved customer. In this case, first, a customer who makes a reservation transmits the maximum permissible cost to the bandwidth management device 400. The bandwidth management device 400 calculates and presents the bandwidth shortage and the reduction budget to the reserved customers based on the bandwidth to be reserved by the customer who makes a reservation and the maximum permissible cost. The reserved customer makes a bid based on the presented information. The bandwidth management device 400 presents the bid information collected by the reserved customers to the customer who makes a reservation. The customer who makes a reservation selects bid information. The bandwidth management device 400 decides the individual reduction bandwidth for the guaranteed bandwidth of the reserved customer based on the bid result, which is the selected bid information. Thereby, the individual reduction bandwidth is decided by bandwidth negotiation between the customers based on the bid information from each of the reserved customers.

In this manner, the bandwidth management device 400 presents the bandwidth shortage and the reduction budget allowed to be provided by subtracting the bandwidth shortage from the guaranteed bandwidth to a plurality of reserved users. Also, the bandwidth management device 400 collects the bid information including the individual reducible bandwidth and the desired reduction amount from the respective reserved users, and presents the bid information to a user who makes a reservation. Also, the bandwidth management device 400 decides the individual reduction bandwidth for the guaranteed bandwidth of the reserved user based on the bid result, which is the selected bid information by the user who makes a reservation. Also, the bandwidth management device 400 assigns the reservation bandwidth to the free bandwidth produced by reducing the individual reduction bandwidth decided respectively from the guaranteed bandwidth of the reserved user based on the bid result. As a result, the individual reduction bandwidth is decided by the bandwidth negotiation between the users based on the bid information of each of the reserved users.

In this regard, in the above-described embodiment, the amount of money in accordance with the reduction bandwidth is rebated, that is to say, the reduction charge is decided. However, the present disclosure is not limited to this. For example, a point corresponding to the reduction charge, which is appropriable to payment of a charge, may be given to a customer.

Also, each component in each unit illustrated in FIG. 12, or the like does not have to be physically configured as illustrated in FIG. 12, or the like. That is to say, a specific configuration of distribution or integration of each unit is not limited to that illustrated in FIG. 12, or the like. All of or a part of the configuration may be functionally or physically distributed or integrated in any units in accordance with various loads, the use state, or the like. For example, the determination unit 132 and the calculation unit 134 may be integrated. Also, each processing illustrated in the figures is not limited to be performed in the above-described order. Each processing may be carried out at the same time, or the order of the processing may be changed as long as a contradiction does not occur in the processing contents.

Further, all of or any part of the various processing functions that are performed in each unit may be carried out by a CPU (or a microcomputer, such as an MPU, a micro controller unit (MCU), or the like). Also, all of or any part of the various processing functions may be performed by a program that is analyzed and executed by a CPU (or a microcomputer, such as an MPU, an MCU, or the like), or by hardware of a wired logic as a matter of course.

Figure 19:
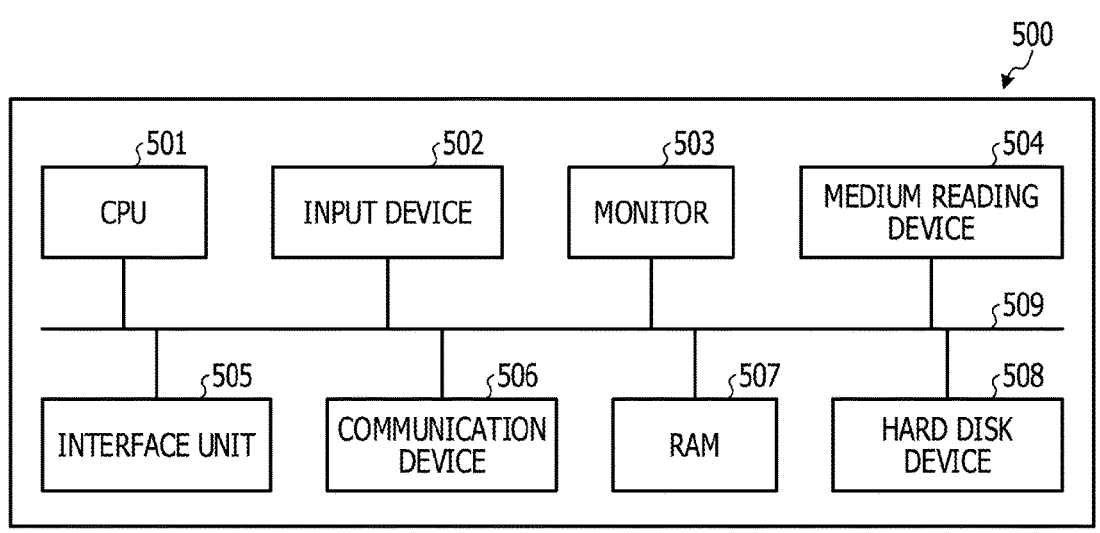
FIG. 19 illustrates an example of a computer that executes a bandwidth management program.

Incidentally, various kinds of processing described in the above embodiments is achieved by executing the program provided in advance on a computer. Thus, in the following, a description will be given of an example of a computer that has the same functions as those of the embodiments described above. FIG. 19 illustrates an example of a computer that executes the bandwidth management program.

As illustrated in FIG. 19, a computer 500 includes a CPU 501 that executes various kinds of operation processing, an input device 502 that receives data input, and a monitor 503. Also, the computer 500 includes a medium reading device 504 that reads programs, or the like from a storage medium, an interface unit 505 for coupling various devices, and a communication device 506 that wiredly or wirelessly couples the other information processing units, and the like. Also, the computer 500 includes a RAM 507 that temporarily stores various kinds of information, and a hard disk device 508. Also, each of the units 501 to 508 are coupled by a bus 509.

The hard disk device 508 stores a bandwidth management program that has the same functions as those of the individual processing units, such as the reception unit 131, the determination unit 132, the acquisition unit 133, the calculation unit 134, the decision unit 135, and the assigning unit 136 that are illustrated in FIG. 2. Also, the hard disk device 508 may include a bandwidth management program that has the same functions as those of the individual processing units, such as the reception unit 131, the determination unit 132, the acquisition unit 133, the calculation unit 134, the decision unit 235, and the assigning unit 136 that are illustrated in FIG. 10. Also, the hard disk device 508 may include a bandwidth management program that has the same functions as those of the individual processing units, such as the reception unit 131, the determination unit 132, the acquisition unit 133, the calculation unit 134, the decision unit 335, and the assigning unit 136 that are illustrated in FIG. 12. Also, the hard disk device 508 may include a bandwidth management program that has the same functions as those of the individual processing units, such as the reception unit 131, the determination unit 132, the acquisition unit 133, the calculation unit 134, the decision unit 435, and the assigning unit 136 that are illustrated in FIG. 15. Also, the hard disk device 508 includes a storage area that stores information, such as the bandwidth management table 121, the charge management table 122, the accounting table 123, or the like. Also, the hard disk device 508 stores various kinds of data for actualizing the bandwidth management program.

The input device 502 receives input of various kinds of information, for example, management information from an administrator who is a user of the computer 500, or the like. The monitor 503 displays, for example, various screens to the administrator of the computer 500. The interface unit 505 includes, for example, the same function as that of the second communication unit 111 illustrated in FIG. 2, and is coupled to the switch device 50. The communication device 506 includes, for example, the same function as that of the first communication unit 110 illustrated in FIG. 2 is coupled to the network N1, or the like, and exchanges various kinds of information with the information processing unit of the customer.

The CPU 501 reads individual programs stored in the hard disk device 508, loads the programs into the RAM 507, and executes the programs in order to perform various kinds of processing. Also, these programs causes the computer 500 to function as the reception unit 131, the determination unit 132, the acquisition unit 133, the calculation unit 134, the decision unit 135, and the assigning unit 136 that are illustrated in FIG. 2. Also, these programs may cause the computer 500 to function as the reception unit 131, the determination unit 132, the acquisition unit 133, the calculation unit 134, the decision unit 235, and the assigning unit 136 that are illustrated in FIG. 10. Also, these programs may cause the computer 500 to function as the reception unit 131, the determination unit 132, the acquisition unit 133, the calculation unit 134, the decision unit 335, and the assigning unit 136 that are illustrated in FIG. 12. Also, these programs may cause the computer 500 to function as the reception unit 131, the determination unit 132, the acquisition unit 133, the calculation unit 134, the decision unit 435, and the assigning unit 136 that are illustrated in FIG. 15.

In this regard, the above-described bandwidth management program does not have to be stored in the hard disk device 508. For example, the program stored in a storage medium capable of being read by the computer 500 may be read and executed by the computer 500. The storage medium capable of being read by the computer 500 includes, for example, a portable recording medium, such as a CD-ROM, a DVD disc, a Universal Serial Bus (USB) memory, and the like, a semiconductor memory, such as a flash memory, and the like, and a hard disk drive, and the like. Also, the bandwidth management program may be stored in a device that is coupled to a public line, the Internet, LAN, or the like, and the computer 500 may read the bandwidth management program from these and may execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method, executed by a computer, the method comprising:
   receiving a reservation request, from a terminal device, regarding a bandwidth of a line;
   first determining whether a total bandwidth of a bandwidth demanded by the reservation request in a time slot which is specified by the received reservation request and a guaranteed bandwidth to one or more different reservation requests exceeds an upper limit value of the line;
   when the total bandwidth exceeds the upper limit value, calculating a reducible bandwidth based on a bandwidth shortage produced by subtracting the permissible upper limit value from the total bandwidth and statistical information of a use bandwidth in the time slot in the past for the one or more different reservation requests;
   reducing the guaranteed bandwidth based on the calculated reducible bandwidth; and
   assigning the bandwidth demanded by the reservation request to a bandwidth reduced from the guaranteed bandwidth.

2. The method according to claim 1, wherein
   the reducing includes determining individual reduction bandwidths produced by dividing the reducible bandwidth by a number of the different reservation requests having a partial reducible bandwidth higher than a predetermined value out of the one or more different reservation requests, and
   the assigning assigns the bandwidth demanded by the reservation request to a bandwidth produced by reducing the individual reduction bandwidth from each of the partial guaranteed bandwidths corresponding to each of the different reservation requests.

3. The method according to claim 1, wherein the reducing includes:
   weighting each of a partial guaranteed bandwidth corresponding to each of the different reservation requests based on the partial reducible bandwidths having a partial reducible bandwidth higher than a predetermined value out of the one or more different reservation requests;
   determining individual reduction bandwidths for each of the different reservation requests based on a results of the weighting, and
   the assigning assigns the bandwidth demanded by the reservation request to a bandwidth produced by reducing the individual reduction bandwidth from each of the partial guaranteed bandwidths corresponding to each of the different reservation requests.

4. An apparatus comprising:
   a memory; and
   a processor coupled to the memory and configured to:
   receive a reservation request, from a terminal device, regarding a bandwidth of a line,
   determine whether a total bandwidth of a bandwidth demanded by the reservation request in a time slot which is specified by the received reservation request and a guaranteed bandwidth to one or more different reservation requests exceeds an upper limit value of the line,
   when the total bandwidth exceeds the upper limit value, calculate a reducible bandwidth based on a bandwidth shortage produced by subtracting the permissible upper limit value from the total bandwidth and statistical information of a use bandwidth in the time slot in the past for the one or more different reservation requests,
   reduce the guaranteed bandwidth based on the calculated reducible bandwidth, and
   assign the bandwidth demanded by the reservation request to a bandwidth reduced from the guaranteed bandwidth.

5. The apparatus according to claim 4, wherein the reduce includes determining individual reduction bandwidths produced by dividing the reducible bandwidth by a number of the different reservation requests having a partial reducible bandwidth higher than a predetermined value out of the one or more different reservation requests, and
   the assign assigns the bandwidth demanded by the reservation request to a bandwidth produced by reducing the individual reduction bandwidth from each of the partial guaranteed bandwidths corresponding to each of the respective different reservation requests.

6. The apparatus according to claim 4, wherein the reduce includes:
   weighting each of a partial guaranteed bandwidth corresponding to each of the different reservation requests based on the partial reducible bandwidths having a partial reducible bandwidth higher than a predetermined value out of the one or more different reservation requests;
   determine individual reduction bandwidths for each of the different reservation requests based on a result of the weighting, and
   assign the bandwidth demanded by the reservation request to a bandwidth produced by reducing the individual reduction bandwidth from each of the partial guaranteed bandwidths corresponding to each of the different reservation requests.

7. A non-transitory storage medium storing a program for causing a computer to execute a process, the process comprising:
receiving a reservation request, from a terminal device, regarding a bandwidth of a line;
first determining whether a total bandwidth of a bandwidth demanded by the reservation request in a time slot which is specified by the received reservation and a guaranteed bandwidth to one or more different reservation requests exceeds an upper limit value of the line;
when the total bandwidth exceeds the upper limit value, calculating a reducible bandwidth based on a bandwidth shortage produced by subtracting the permissible upper limit value from the total bandwidth and statistical information of a use bandwidth in the time slot in the past for the one or more different reservation requests;
reducing the guaranteed bandwidth based on the calculated reducible bandwidth; and
assigning the bandwidth demanded by the reservation request to a bandwidth reduced from the guaranteed bandwidth.

8. The non-transitory storage medium according to claim 7, wherein
the reducing includes determining individual reduction bandwidths produced by dividing the reducible bandwidth by a number of the different reservation requests having a partial reducible bandwidth higher than a predetermined value out of the one or more different reservation requests, and
the assigning assigns the bandwidth demanded by the reservation request to a bandwidth produced by reducing the individual reduction bandwidth from each of the partial guaranteed bandwidths corresponding to each of the different reservation requests.

9. The non-transitory storage medium according to claim 7, wherein the reducing includes:
weighting each of a partial guaranteed bandwidth corresponding to each of the different reservation requests based on the partial reducible bandwidths having a partial reducible bandwidth higher than a predetermined value out of the one or more different reservation requests;
determining individual reduction bandwidths for each of the different reservation requests based on a result of the weighting, and
the assigning assigns the bandwidth demanded by the reservation request to a bandwidth produced by reducing the individual reduction bandwidth from each of the partial guaranteed bandwidths corresponding to each of the different reservation requests.

10. The method according to claim 1, wherein the guaranteed bandwidth to each of the one or more different reservation requests includes a maximum guaranteed bandwidth and a minimum guaranteed bandwidth, an individual reducible bandwidth for each of the one or more different reservation requests is calculated by subtracting a higher value between the minimum guaranteed bandwidth and the statistical information for each of the one or more different reservation requests from the maximum guaranteed bandwidth, and the reducible bandwidth is calculated by a total of the individual reducible bandwidths for the one or more different reservation requests.

11. The apparatus according to claim 4, wherein the guaranteed bandwidth to each of the one or more different reservation requests includes a maximum guaranteed bandwidth and a minimum guaranteed bandwidth, an individual reducible bandwidth for each of the one or more different reservation requests is calculated by subtracting a higher value between the minimum guaranteed bandwidth and the statistical information for each of the one or more different reservation requests from the maximum guaranteed bandwidth, and the reducible bandwidth is calculated by a total of the individual reducible bandwidths for the one or more different reservation requests.

12. The non-transitory storage medium according to claim 7, wherein the guaranteed bandwidth to each of the one or more different reservation requests includes a maximum guaranteed bandwidth and a minimum guaranteed bandwidth, an individual reducible bandwidth for each of the one or more different reservation requests is calculated by subtracting a higher value between the minimum guaranteed bandwidth and the statistical information for each of the one or more different reservation requests from the maximum guaranteed bandwidth, and the reducible bandwidth is calculated by a total of the individual reducible bandwidths for the one or more different reservation requests.

* * * * *